US009648039B1

(12) United States Patent
Lipinski et al.

(10) Patent No.: US 9,648,039 B1
(45) Date of Patent: May 9, 2017

(54) SYSTEM AND METHOD FOR SECURING A NETWORK

(75) Inventors: Michael J. Lipinski, Rochester Hills, MI (US); Nathan Einwechter, St. Mary's (CA)

(73) Assignee: RazorThreat, Inc., Royal Oak, MI (US)

( * ) Notice: Subject to any disclaimer, the term of this patent is extended or adjusted under 35 U.S.C. 154(b) by 1373 days.

(21) Appl. No.: 12/019,482

(22) Filed: Jan. 24, 2008

(51) Int. Cl.
*G06F 11/00* (2006.01)
*H04L 29/06* (2006.01)
*G06F 21/57* (2013.01)

(52) U.S. Cl.
CPC ............ *H04L 63/20* (2013.01); *G06F 21/577* (2013.01)

(58) Field of Classification Search
CPC ............................... H04L 63/20; G06F 21/577
See application file for complete search history.

(56) References Cited

U.S. PATENT DOCUMENTS

| 6,233,686 | B1* | 5/2001 | Zenchelsky et al. ............. 726/1 |
| 2005/0010804 | A1* | 1/2005 | Bruening et al. ............. 713/200 |
| 2005/0010821 | A1* | 1/2005 | Cooper et al. ................. 713/201 |
| 2006/0056370 | A1* | 3/2006 | Hancock .............. H04B 7/2606 370/338 |
| 2006/0236392 | A1* | 10/2006 | Thomas ................ G06F 21/562 726/23 |
| 2007/0130077 | A1* | 6/2007 | Jagadeesan et al. ............ 705/59 |
| 2009/0235325 | A1* | 9/2009 | Dimitrakos et al. ............. 726/1 |

* cited by examiner

*Primary Examiner* — Teshome Hailu
(74) *Attorney, Agent, or Firm* — Varnum, Riddgering, Schmidt & Howlett LLP

(57) ABSTRACT

Communications can be proactively monitored using a system that is rules-based instead of anomaly-based or signature-based. Large quantities of information can be processed to deliver actionable information in a timely and prioritized fashion. The system can include a graphical dashboard interface to facilitate the management of a network or a network of overlapping networks. The system can be used to monitor, validate, and tune all or substantially all security controls within the secured area that include all of the networks for a particular enterprise. Unique address identification heuristics and source address identification heuristics can be incorporated into the system.

12 Claims, 19 Drawing Sheets

IP Details 200.3.116.4

The "target" column is our submitters ip address. We will not show this ip address.

Summary for 200.3.116.4

| Date | Time (UTC) | Source | Source Port | Target | Target Port | Protocol | Flags |
|---|---|---|---|---|---|---|---|
| 2006-12-30 | 06:10:10 | 200.003.116.004 | 45365 | -NA- | 53 | 17 | |
| 2006-12-30 | 10:15:01 | 200.003.116.004 | 53 | -NA- | 32809 | 17 | |
| 2006-12-30 | 10:15:05 | 200.003.116.004 | 53 | -NA- | 32809 | 17 | |
| 2006-12-31 | 19:38:33 | 200.003.116.004 | 53 | -NA- | 32809 | 17 | |
| 2006-12-31 | 19:38:37 | 200.003.116.004 | 53 | -NA- | 32809 | 17 | |
| 2007-01-01 | 09:59:25 | 200.003.116.004 | 53 | -NA- | 32809 | 17 | |
| 2007-01-01 | 22:33:18 | 200.003.116.004 | 53 | -NA- | 32809 | 17 | |
| 2007-01-01 | 21:30:51 | 200.003.116.004 | 53 | -NA- | 32768 | 17 | |
| 2007-01-03 | 10:13:50 | 200.003.116.004 | 45365 | -NA- | 53 | 17 | |
| 2007-01-07 | 05:40:00 | 200.003.116.004 | 53 | -NA- | 32809 | 17 | |
| 2007-01-09 | 16:38:23 | 200.003.116.004 | 53 | -NA- | 32809 | 17 | |
| 2007-01-09 | 16:38:27 | 200.003.116.004 | 53 | -NA- | 32809 | 17 | |
| 2007-01-14 | 00:33:52 | 200.003.116.004 | 53 | -NA- | 32809 | 17 | |
| 2007-01-14 | 00:33:56 | 200.003.116.004 | 53 | -NA- | 32809 | 17 | |
| 2007-01-16 | 01:34:15 | 200.003.116.004 | 53 | -NA- | 32809 | 17 | |
| 2007-01-16 | 01:34:46 | 200.003.116.004 | 53 | -NA- | 32768 | 17 | |
| 2007-01-17 | 15:42:45 | 200.003.116.004 | 53 | -NA- | 32809 | 17 | |
| 2007-01-18 | 09:45:15 | 200.003.116.004 | 53 | -NA- | 32809 | 17 | |
| 2007-01-18 | 05:41:46 | 200.003.116.004 | 53 | -NA- | 32809 | 17 | |
| 2007-01-20 | 01:30:08 | 200.003.116.004 | 53 | -NA- | 32809 | 17 | |
| 2007-01-20 | 05:39:21 | 200.003.116.004 | 53 | -NA- | 32809 | 17 | |
| 2007-01-20 | 13:37:16 | 200.003.116.004 | 53 | -NA- | 32809 | 17 | |
| 2007-01-21 | 10:22:19 | 200.003.116.004 | 53 | -NA- | 32809 | 17 | |
| 2007-01-21 | 10:22:24 | 200.003.116.004 | 53 | -NA- | 32809 | 17 | |
| 2007-01-21 | 22:38:32 | 200.003.116.004 | 53 | -NA- | 32809 | 17 | |
| 2007-01-22 | 06:46:01 | 200.003.116.004 | 53 | -NA- | 32809 | 17 | |

Figure 10

| Domains | Domain 1 - XYZ | Application | Web Servers | DMZ 2 | Internal LAN | DMZ | Remote Access | Sample 1 | Sample 2 | Sample 3 | Sam |
|---|---|---|---|---|---|---|---|---|---|---|---|
| Domain 1 XYZ | ■ | | | | | | | | | | |
| Application | | ■ | | | | | | | | | |
| Web Servers | | | ■ | | | | | | | | |
| DMZ 2 | | | | ■ | | | | | | | |
| Internal LAN | | | | | ■ | | | | | | |
| DMZ | | | | | | ■ | | | | | |
| Remote Access | | | | | | | ■ | | | | |
| Sample 1 | | | | | | | | ■ | | | |
| Sample 2 | | | | | | | | | ■ | | |
| Sample 3 | | | | | | | | | | ■ | |
| Sample 4 | | | | | | | | | | | |
| Sample 5 | | | | | | | | | | | |
| Sample 6 | | | | | | | | | | | |

SYSTEM AND METHOD FOR SECURING A NETWORK

RELATED APPLICATIONS

This utility patent application claims priority to: (a) a U.S. Provisional Patent Application titled "NETWORK SECURITY SYSTEM AND METHOD" (Ser. No. 60/823,898) that was filed on Aug. 29, 2006; (b) a U.S. Utility Patent Application titled "SYSTEM AND METHOD FOR SECURING A NETWORK" (Ser. No. 11/847,265) that was filed on Aug. 29, 2007; and (c) a U.S. Utility Patent Application titled "SYSTEM AND METHOD FOR SECURING A NETWORK" (Ser. No. 11/939,550) that was filed on Nov. 13, 2007; the contents of which are hereby incorporated by reference in their entirety.

BACKGROUND OF INVENTION

The invention relates generally to a system and method for the identifying security threats to a computer, a network of computers, or a network of interconnected networks (collectively the "system").

Individuals, partnerships, small businesses, global corporations, universities, health care providers, community-based organizations, government agencies, non-profit groups, religious organizations, and other organizations and entities (collectively "entities") increasingly rely on information technology to perform a wide variety of functions. Entities increasingly use information technology to interact with each other and the world. The ability to facilitate the sharing of information between two or more entities can result in entirely new ways to interact, increase efficiency, cut costs, save lives, spur innovation, enhance personal satisfaction, result in the performance of beneficial activities, and otherwise enhance human endeavors in a wide variety of different ways.

Unfortunately, the increasing advantages of information sharing, storing, and processing seem to be inevitably coupled with significant security-related risks. Unauthorized users can attempt to gain access to and misuse proprietary applications. Sensitive information can be improperly obtained and quickly disseminated to a large group of recipients. The prospect of unauthorized access can make entities reluctant to take full advantage of information sharing opportunities. Increased reliance on technology can make an entity vulnerable to disruptions and other undesirable effects caused by malicious activities from both inside and outside parties. Identity theft is an ever increasing problem. Valuable data can be corrupted or lost all together. New threats to networks can develop on an almost continuous basis and efforts to make information technology more secure often seem to be stuck in the mode of "fighting the last war" instead of proactively preparing for the next innovative threat.

Despite the importance of enhancing the security of data and information technology architecture, prior art approaches affirmatively teach away from solutions that are proactive, comprehensive, and/or bottom-up. Existing approaches to the identification of network intrusions and other threats are typically either signature based or anomaly based. The effectiveness of traditional security approaches are often thwarted by a daunting volume of audit data. Known and easily accessible information is not typically used to anticipate threats or to otherwise proactively enhance the security of a network.

SUMMARY OF THE INVENTION

The invention relates generally to a system and method for identifying security threats to a computer, a network of computers, or a network of interconnected networks (collectively the "system").

The system is not limited to detecting threats by identification of the source of the threat, or by observance of undesirable phenomenon manifesting the threat. Rather, the system can identify threats by identifying when an attempted communication or interaction is not in compliance with security rules.

The system can identify and monitor threat access paths and detect violations of security policies that relate specifically to communications between the elements on those paths. Threat access paths can be monitored and evaluated from a bottom-up perspective, so threats can be identified even before there is a first attack or a first victim. The data incorporated into the system can be continuously updated and cumulatively referenced, which in turn enhance the ability of the system to identify threats.

The system can use an identification heuristic to identify inter-domain communications and then use an assessment heuristic to associate an assessment metric that represents the risk associated with the potential threat. In some embodiments, the system will also invoke a vulnerability heuristic to factor the impact of a threat to a particular network domain.

The system can be more fully understood upon reading the following detailed description in conjunction with the accompanying drawings.

BRIEF DESCRIPTION OF THE DRAWINGS

The following drawings illustrate different examples and embodiments of the system:

FIG. 10 is a screen print diagram illustrating an example of a communication log for a particular communication source.

FIG. 11 is a screen print diagram illustrating an example a graphical enterprise security policy document.

FIG. 12 is a screen print diagram illustrating an example a graphical enterprise security policy document.

Figure 1:
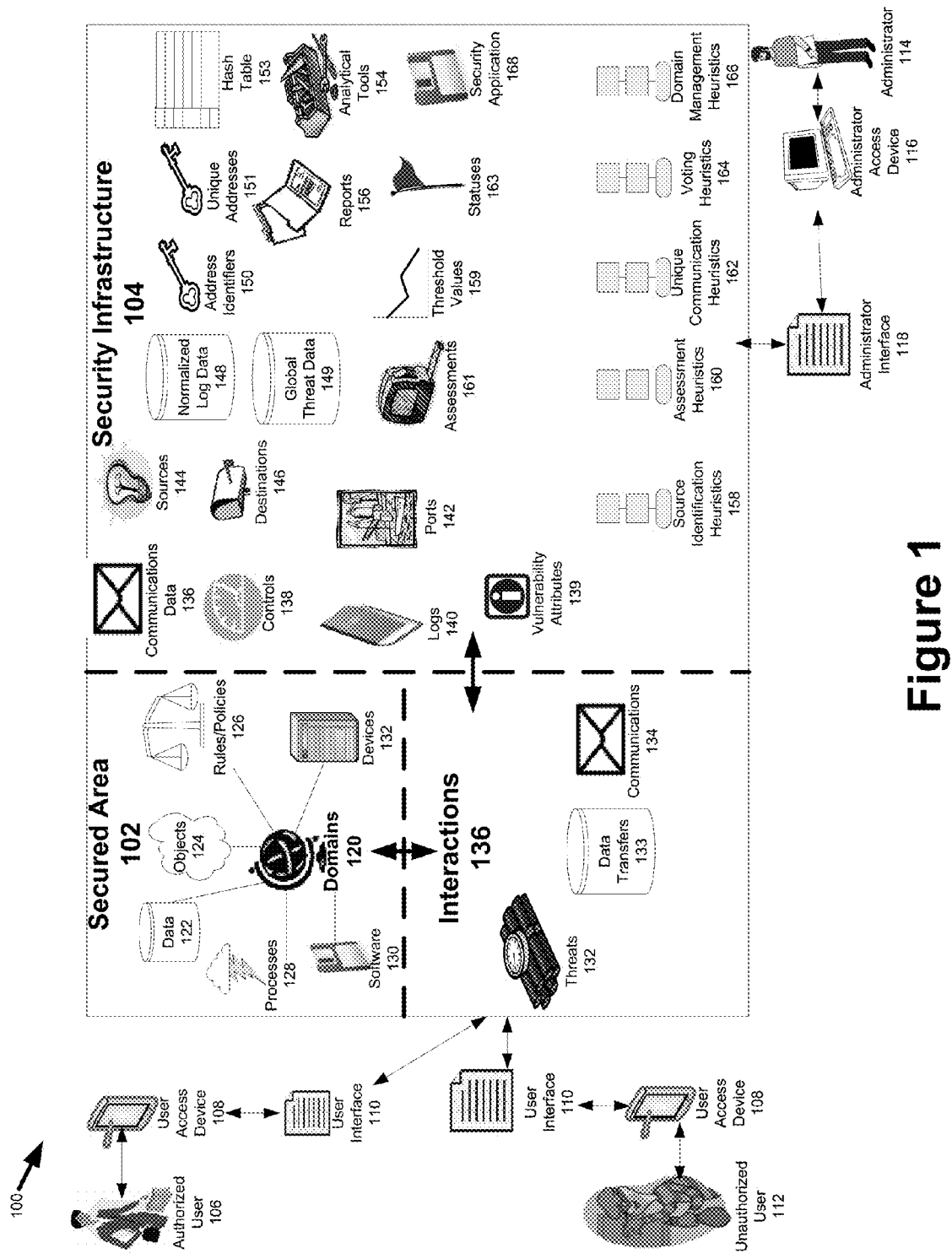
FIG. 1 is an environmental diagram illustrating an example of the system and some of the different processing elements that can be incorporated into the system.

The system is described in the detailed description section below.

DETAILED DESCRIPTION

The invention relates generally to a system and method for identifying security threats to a computer, a network of computers, or a network of interconnected networks (collectively the "system").

I. Overview

The system uses a security infrastructure to monitor a secured area such as a network or a network of networks so that it is safe for use by authorized users engaging in authorized interactions with the system.

An inter-domain communication engine (ICE) can be used by the system to identify unauthorized communications while monitoring all or substantially all of the communications within the secured area. A threat intelligence engine (TIE) can be used to associate different threats with different degrees of priority for enterprise planning purposes. A threat analysis console (TAC) can integrate the results from the ICE and TIE, allowing administrators to effective remediate threats as early as possible. The system can be configured to generate reports relating to policy compliance over time to facilitate a continuous improvement process with respect to security.

The system can provide a comprehensive and integrated security solution that incorporates and integrates information captured from other security-related tools. Supported inputs can include but are not limited to firewalls, intrusion detection systems (IDS), intrusion prevention systems (IPS), routers, switches, log aggregators, vulnerability assessment tools, SIEM products, threat intelligence software, scanners, system logs, NetFlow, and s-flow. The effectiveness of the system is ultimately grounded in the ability of the system to access data, so the continuous capture of new data points allows the system to continuously re-evaluate the identification and assessment of threats based on the then updated cumulative data. Existing communication logs can be accessed by the system so that an implementer of the system can utilize their existing security infrastructure.

The system can use a rules-based approach to identify potential threats. Thus, the system is not limited to identifying threats by identifying a particular anomaly or phenomenon in a domain or by identifying a communication source as being a known source of trouble. The system can facilitate the ability of administrators to define an enterprise as interconnected hierarchical domains, with different domains being subject to different rules. All or substantially all of the communications data and other interactions can be proactively monitored for threats and vulnerabilities. Communications data and other interactions are evaluated with respect to unique addresses, so non-compliance with domain rules can be identified on a unique address by unique address basis.

Enterprises can be defined in terms of hierarchical domains with rules defined in a similar hierarchical manner. A user can set a particular rule at a high-level domain, automatically associating the rule to all of the different low-level domains associated with the high-level domain.

The system can be used to generate threat assessments that are specific to a unique address source. In evaluating threats, the system can be configured to automatically compare a system generated threat assessment metric to a pre-defined threshold value that is influenced by the particular domain and/or rule. Threats and priorities can be displayed online in a graphical format that makes effective use of color, sound, and graphics.

In setting rules and authorizations, the administrator interface can provide for authorizing an interaction on a per port basis. In evaluating threats and creating threat assessments, the system can factor in information that is not specific to the interaction, such as global threat information and other extrinsic factors such as the date, the occurrence of a particular event, etc. The system can be configured to function in such a way as to not be influenced by the frequency of interactions originating form a unique address in evaluating the potential threat of interactions from that unique address. The system can use a source identification heuristic to distinguish between unique addresses that are sources and unique addresses that are not sources. The system can factor in vulnerability assessments and enterprise priorities in prioritizing and evaluating certain threats.

The system can include a variety of graphical tools that enhance the ability of administrators to effective monitor compliance with domain-specific rules on an enterprise-wide basis. By identifying potential threats proactively, the system can enhance the ability of organizations to objectively manage security policies and practices in a verifiable and provable manner. The system can provide a single interface for integrating the management of disparate security point solutions.

The system can use a variety of tools and methods for identifying policy domains and the allowed communications and other interactions between the domains. The system can also apply a variety of technologies for unique address identification and source address identification in or within a TCP communication session. The system can be used as an add-on to prior art security tools. Other tools can be used to supply communications data, global threat data, identify unique addresses, and filter source identifiers. By managing and mitigating threats based upon real network traffic and the definition of allowed domain communications the system can provide a greater level of policy, process and technology controls.

The concept of managing communications between security policy domains is typically a tedious, manual, labor intensive activity. The system can automate this process using the rules associated with the various domains (often in a hierarchical fashion) to deliver information in a timely fashion, using various heuristics relating to information flow, the management of massive amounts of non-standard information and address identification for communications (including for example TCP communications).

Prior art approaches affirmatively teach away from solutions that are proactive, comprehensive, and/or bottom-up. Existing approaches to the identification of network intrusions and other threats are typically either signature based or anomaly based. Thus, existing approaches are vulnerable to new threats, blended combinations of threats, and highly targeted threats, such as company specific threats. Anti-virus software, firewalls, intrusion detection applications, intrusion prevention software, security information and event management software (SEIM), and network behavior analysis tools can only stop threats that they already "know" about or threats that they "learn" about.

Security software and methodology is already resulting in data overload. Organizations no longer police their networks for communication violations because there is too much sophistication in setting rules and too much data to monitor. Unlike prior art approaches that lack the means to process mass quantities of data in way that results in actionable intelligence, the system can monitor all or substantially all communications on an enterprise-wide basis and deliver actionable information in a prioritized manner. Because the system can proactively evaluate compliance with domain-based rules, the system can protect the "first victim" from a threat.

The system can incorporate data from a wide variety of existing sources and controls, including IDS/IPS, firewalls, SIM/SEM, and other types of log generators and analytical tools. The system can proactively validate all deployed controls and alert users to threats on a real-time basis.

The system can be embodied in a wide variety of different configuration that allow organizations to quickly and accurately process network communication information and determines the effectiveness of defined security policies on real world performance.

II. Introduction of Elements and Definitions

FIG. 1 is an environmental diagram illustrating an example of a system 100 and some of the different processing elements that can be incorporated into the system 100. The system 100 is used to create a secured area 102 for interactions 136 by authorized users 102 through the use of a security infrastructure 104 that can be managed by an administrator 114.

A. Users

A user can be a human being, a software application, a hardware device, a network, a signal embodying information, or any other person or mechanism capable of directly or indirectly accessing or otherwise interacting with the system 100.

1. Authorized User

An authorized user 106 is a user who is performing an interaction 136 with the system 100 that is consistent with the rules 126 of the system 100. A particular user can be an authorized user 106 with respect to one interaction 136 and an unauthorized user 106 with respect to another interaction 136.

2. Unauthorized User

An unauthorized user 112 is a user who is performing an interaction 136 with the system 100 that is against the rules 126 of the system 100.

3. Administrator

An administrator 114 is a user who is responsible for managing the security of one or more secured areas 102 in the system 100. A user can be an administrator 114 with respect to one secured area 102, and an authorized user 106 or an unauthorized user 112 with respect to other secured areas 102 in the system 100.

B. Access Devices

An access device is any device that allows a user such as an authorized user 106, an unauthorized user 112, or an administrator 114 to interact with the system 100. Examples of access devices include desktop computers, laptop computers, mainframe computers, cell phones, personal digital assistants (PDA), satellite pagers, automated answering machines configured with voice recognition technology, or any other device that allows a user to access the system 100.

1. User Access Device

A user access device 108 is an access device that is used to access a secured area 102 within the system 100.

2. Administrator Access Device

An administrator access device 116 is an access device that is used to access the security infrastructure 103 for a secured area within the system 100. An access device for a particular interaction 136 can be an administrator access device 116 while serving as a user access device 108 for a different interaction 136.

C. Interface

An interface is software mechanism through which a user interacts with the system 100. Examples of interfaces include web pages, graphical user interfaces (GUIs), command line interfaces, voice recognition technology, and other technologies.

1. User Interface

A user interface 110 is an interface used by an authorized user 106 or an unauthorized user 112 to interact with one or more secured areas 102 on the system 100.

2. Administrator Interface

An administrator interface 118 is an interface used by an administrator 114 to interact with the security infrastructure 104 associated with one more secured areas 102. The system 100 can effectively integrate the management of a wide variety of different security controls 138, tools 154, and applications 168 into a single administrator interface 118. The administrator interface 118 can include a TAO dashboard (see FIGS. 16-22) that delivers reporting functions, analytical tools 154, and threat intelligence components. The administrator interface 118 can also include a manager-of-managers module (see FIG. 22) to integrate all enterprise security applications 168 into a single administrator interface 118. The TAO can be the part of the interface 118 that uses the output from ICE.

D. Secured Area

A secured area 102 is an information technology boundary within the system 100 that is secured. In most embodiments of the system 100, the boundaries of a secured area 102 are defined with respect to one or more domains 120. The secured area 102 can constitute a single computer, a network of computers, or multiple interconnected networks that span a large global enterprise or group of global enterprises. The system 100 can be scaled to protect a single stand alone computer, or the information technology infrastructure of large international enterprises.

1. Domains

A secured area 102 can be defined with respect to one or more subunits referred to as domains 120. A domain 120 is collection of elements that are subject to one or more common security policies/rules 126. Thus, a domain 120 can also be referred to as a security policy domain 120. The elements of a domain 120 can include or be defined by data 122, objects 124, processes 128, software applications 130, and devices 132. In many embodiments of the system 100, domains are organized in a hierarchical tree of domains 126 and corresponding domain relationships. For example, an enterprise can be associated with a hierarchical tree of relationships involving sub-units (such as divisions or teams), functions (such as accounting, sales, marketing), particular individual and groups of software applications, and even particular devices (such as for example an individual printer on the third floor of an accounting department). Hierarchical domain identities can overlap with each other. For example, some rules/policies 126 can be set at a very high level, such as an enterprise wide or sub-unit wide rule/policy 126. That high level domain can include many different mid-level or low-level domains, such as a rule/policy 126 that applies to a specific printer device 132 that is used in one location of the enterprise or subunit.

2. Data

A domain 120 can be defined with respect data 122. Data 122 is information stored, displayed, or accessed by the system 100. Different types of data 122 will be subject to different rules/policies 126. Just as data 122 can be associated with overlapping hierarchical rules/policies 126, data can also be associated with overlapping and hierarchical domains 120.

3. Objects

A domain 120 can be defined with respect to an object 124 used by an object oriented programming language. Objects 124 can be associated with different domains 120 and subject to different rules/policies 126.

4. Rules/Policies

Rules/policies 126 (collectively "rules" 126) define which interactions 136 are authorized and which interactions 136 are not authorized. Rules 126 can be defined in a default authorized framework (e.g. only specifically addressed interactions are prohibited) or in a default unauthorized framework (e.g. only specifically addressed interactions are allowed). Rules 126 are associated with domains 120. In embodiments of the system 100 where domains 120 are defined in a hierarchical manner, rules 126 can be defined at different levels in the domain hierarchy.

Rules 126 can be defined both implicitly and explicitly. In the context of a simply configuration involving the Internet, a DMZ (de-militarized zone), and an internal local area network (LAN), the following rules 126 could be defined. The LAN could be permitted to browse the Internet, while the Internet could be prohibited from browsing the internal LAN. The Internet can be given limited access rights to the DMZ, and the DMZ can in turn be given limited communication rights with respect to the internal LAN.

5. Devices

A device 132 is any device capable of connecting to the secured area 102. Examples of devices can include printers, laptop computers, scanners, desktop computers, input/output devices, and any other device that is associated with a domain 120.

6. Software

A software application 130 is a computer program (with associated files) that is associated with a particular domain 120 and is subject to the access rules 126 of that domain 120.

7. Processes

A process 128 is a series of steps in which one or more of the steps is performed in a secured area 102. A process 128 is generally performed by one or more software applications 130 and will often involve data 122, objects 124, and/or devices 132. Domains 120 can be defined with respect to specific processes 128 or to groups of related processes 128. Rules 126 can be defined at different levels of processing in a hierarchical domain embodiment of the system 100.

E. Interactions

An interaction 136 is any action in the secured area 102 caused or influenced by a user. Interactions 136 typically involve a communication 134 from a user. Some communications 134 are threats while others are not. Some communications 134 include a data transfer 133 while others do not.

1. Communications

A communication 134 is any attempt by a user to exchange access, submit, or receive information in a secured area or to otherwise avail the user to the resources within a secured area 102. The prior art includes many different types of communication logs that are capable of tracking communications 134 with a secured area.

Inter-domain communications 134 are important to efforts to secure the secured area 102. By monitoring inter-domain communications (e.g. communications 134 with a destination domain 120 different from the originating domain 120), the system 100 can show the effectiveness of deployed controls 138, show potential for information leakage, show potentials for covert channels, show ways to remediate threats 132 by separating the threat 132 from the applicable vulnerability (e.g. proactive threat interdiction), as well as identify rogue devices 132.

2. Threats

Some communications 134 are authorized communications (e.g. consistent with the rules 126) while other communications 134 are unauthorized communications 134 (e.g. they are contrary to the rules 126). The system 100 can be configured to treat any unauthorized communication 134 as a threat 132. The system 100 can be configured to prioritize threats 132 on the basis of their potential impact, the domain 120 for which the rules 126 are being violated, and a variety of other factors.

3. Data Transfers

Some communications 134 can trigger significant events which can result in particularly undesirable outcomes. A communication 134 that results in a data transfer 133.

F. Security Infrastructure

The system 100 includes one or more secured areas 102 with each secured area 102 including a security infrastructure 104 to monitor the security of the secured area 102. Different embodiments of the system 100 can include different infrastructure elements.

1. Communications Data

Communications data 136 is potentially any data relating to a communication 134. In many embodiments of the system 100, all or substantially all communications data 136 can be monitored and evaluated by the system 100.

2. Sources

A source 144 is the location at which a communication 134 transmitted to a destination 146. A single communication 134 can be routed through many sources 144. Communication data 136 can include information about the source 144 such as an IP address for a particular communication 134.

3. Normalized Log Data

Normalized log data 148 is a log of communications data 136 that has been normalized. Many embodiments of the system 100 use normalized log data 148 that can be gathered from a wide variety of different sources. Normalized log data 148 is described in greater detail below. There are many different prior art tools that can be used to capture and normalize communications data 136.

Normalized log data 148 can be obtained from various log sources and as raw data from controls 138. Raw data can be captured from controls 138 such as firewalls, IDS/IPS devices, SIEM products, network switches, network routers, log aggregators, event correlation systems, host-base computing systems, and operating systems. The normalization of log data 149 is a process that can be performed by part of the ICE engine that accepts data from different sources, translates the data into a common parsed format for input into the ICE. The system 100 then uses the normalized data as the input for subsequent processing.

4. Address Identifiers

An address identifier 150 is an attribute that uniquely identifies a source 144. For example, an IP address is a common example of an address identifier 150. The address identifier 150 (which can also be referred to as a source address identifier) provides the system with the ability to determine the true source 144 of a session in a stream of TCP communications. This can facilitate the accurate management and reporting of rules 126 pertaining to domain communications 134.

5. Unique Addresses

A unique address 151 is an address identifier 150. Security threats 132 to the secured area 102 will often involve communications 134 that are repeated multiple times. In evaluating threats 132, it can be useful to filter out non-unique addresses 151 and to analysis communication data 136 in terms of unique addresses 151. Some embodiments of the system 100 can use a voting heuristic 164 to identify unique addresses 151 from communications data 136.

A unique address 151 can also be referred to as a unique address identifier. A unique address 151 can parse normalized communication data 136 even further by rating and matching all log entries and eliminated multiple occurrences of duplicate entries. Therefore, only a single occurrence of a communication 134 will be generated in report entries while preserving the total count of each such occurrence.

6. Hash Table

A hash table 153 A data structure that divides all elements into (preferably) equal-sized categories, or buckets, to allow quick access to the elements. The system 100 can use a hash table 153 to identify unique addresses 151 from the communication data 136.

7. Controls

A control 138 is a tool used by the system 100 to either capture communication data 136 or otherwise monitor whether a particular communication 134 is in compliance with applicable rules 126. The system 100 can incorporate a wide variety of different controls 138. The system 100 can benefit from factoring in information from a wide variety of different controls 138.

8. Destinations

A destination 146 is an element within a domain 120 at which a communication 132 within the secured area 102 is completed. Destinations 146 can be associated with domains 120 and applicable rules 126. Attributes relating to a particular destination 146 such as vulnerability attributes 139 can be factored in by the system 100 in prioritizing among various potential threats 132 to the system 100.

9. Global Threat Data

Global threat data 149 is data extrinsic to a particular communication 134 that can impact the threat assessment 161 for a particular communication 134. For example, global threat data 149 can include information compiled about threats 149 experienced outside the scope of the system 100. Current events, historical information relating to dates and times, and other sources of information can constitute potentially useful global threat data 149.

10. Reports

A report 156 is a compilation of information relating to the system 100. The system 100 can be configured to provide a wide variety of different pre-defined reports as well as ad hoc reports. Automated reports 156 can be configured by rules 126 that determine what is reported and when. The system 100 can used a framework of automated reports 156 and alerts in conjunction with graphical displays of security threats 132. Reports can include user-level mapping such as user-to-user mapping and user-to-group mapping.

11. Analytical Tools

An analytical tool 154 is a tool 154 that is configured to analyze information from a control 138. The system 100 can be configured to incorporate a wide variety of controls 138 and analytical tools 154 in the processing of the system 100.

12. Logs

A log 140 is compilation of data. The system 100 can be configured to create, update, and access logs 140 of communications data 136 from a wide variety of different controls 138. Normalized log data 148 is a useful input to the system 100. The system 100 can process all or substantially all normalized log data 148 in a ground-up approach to securing the secured area 102.

13. Ports

A port 142 is a data connection in a computer or network in the secured area 102 to which a peripheral device or a transmission line from a remote terminal can be attached or a communication 134 received. Rules 126 can be set at the level of individual ports 142.

14. Assessments

An assessment 161 is an analysis generated by the system 100. In many embodiments, assessments 161 can be generated in the form of numerical assessments or metrics. For example, the system 100 can be used to create threat assessment metrics, risk assessment metrics, malicious intent assessment metric, and other types of metrics.

The assessments 161 generated by the system 100 can include a higher order (such as a second, third, fourth, or higher) analysis which can be important in identifying bot-net or other rogue threats 132 the leak confidential information.

15. Threshold Values

A threshold value 159 is a predefined or calculated value that be used in a comparison with a numerical assessment 161. For example, a rule 126 for a particular domain 120 may use a predefined threshold value 159 to compare to a numerical threat assessment (e.g. threat assessment metric). If the threat assessment metric is higher than the predefined threshold value 159, certain processing can be automatically triggered by the system 100, such as the triggering of an alert, the creation of a report 156, displaying a communication 134 on a graphical interface using a particular color, etc.

One example of a potentially desirable threshold value 159 is an industry threat average as calculated on a per port 142 basis. Such a threshold value 159 would also constitute an example of a external threat data 149.

16. Statuses

A status 163 is potentially any condition that is system 100 is cognizant of. Rules 126 can automatically trigger certain processing to be performed as a result of a change in a status 163. For example, real time alerts can be sent to the administrator interface 118 if a certain magnitude of a threat 132 is detected by the system 100. Statuses 163 can be domain specific and are defined by rules 126. A status 163 or a change in status 163 can be used to trigger alerts for defined events that are likely to be of interest to one or more administrators 114.

17. Security Application

A security application 168 is a prior art security tool. The system 100 can be configured to interface with many different security applications 168 and to receive data from a wide variety of different security applications 168 that implement different approaches while focusing on different types of data.

18. Vulnerability Attributes

A vulnerability attribute 139 is an attribute relating to the perceived vulnerability of a domain 120 by one or more administrators 114. Some embodiments of the system 100 will not include vulnerability assessments in the processing of the system 100. Other embodiments can factor in such assessments. For example, a particular threat 132 may pose a relatively low risk to a certain domain 120 while posing a much higher risk in a more vulnerable domain 120.

19. Source Identification Heuristics

A source identification heuristic 158 is a process by which the system 100 identifies the source 144 of a communication 134. The system 100 can be configured to implement a wide variety of different source identification heuristics 158.

A source identification heuristic 158 can be used when the direction of communications 134 within a log file cannot be assured but is required to be determined before being processed by another application.

This heuristic does not depend on existing port 142 lists, but instead uses some fundamental principles of network communication patterns to determine the source and destination of communications over networks. This means the system 100 cannot be tricked into reversing a communications direction by simply changing ports 142. Other safeguards are in place within the process to prevent any other tampering of results from a network level by removing the concern over specific IP-to-IP communication frequency. Thus, the process is able to independently determine the correct source and destination address of a communication within a set of communications 134 when sufficient data is present, regardless of all conceivable attempts to skew the results by malicious people within a network.

The rule used for this process is simple; a service will be connected to by multiple different internet addresses on the same port from different source ports. More about this is discussed during the voting stage of the process. The source identification heuristic can involve the invocation of a unique communications heuristic 162 and a voting heuristic 160. The required inputs for the heuristic 158 can include a log 140 that includes the following fields: Source IP, Source Port, Destination IP, Destination Port, and Protocol. The heuristic 158 works for TCP communications, as UDP is a one-way protocol and thus does not require source identification. If there is any doubt as to the validity of the original data's pairings for UDP, this process can be run over it. ICMP should not be used during this process, but could be if there are reasons to believe that there are covert channels moving information across ICMP for which there is a need to definitively determine which direction the communication 134 was really going and where it originated.

After invoking the unique communications heuristic 162 (see below) and then invoking the voting heuristic 164 (see below), the last step in the process is to make the decision as to which pairs can be considered the destination (server). There are two alternative options of decision making available for this process. The first is to define a score threshold at which to say that a pair is a destination/server. This allows the final decision to be fine tuned for any given network. The second system for decision making is to compare every single original pairing and decide which of the two was the server by comparing their voting scores, which is the highest is the destination/server.

20. Assessment Heuristics

An assessment heuristic 160 is a process by which the system 100 creates an assessment 161 such as a threat assessment metric that identifies non-compliant communications 134 and assigns a severity metric to identify the magnitude of the violation. The system 100 can be configured to implement a wide variety of different assessment heuristics 160. Assessment heuristics 160 are very context specific and rules-driven.

21. Unique Communication Heuristics

A unique communication heuristic 162 is a process by which the system 100 identifies unique sources of communication 134. The system 100 can be configured to implement a wide variety of different unique communication heuristics 162.

The unique communications heuristic 162 reduces communications 134 from various logs 140 to unique entries. This is done by using a hash table 153 to determine if a communication has been encountered already or not. If it has not, the system 100 prints it out. If it has been previously encountered, the heuristic 162 does nothing. Results are in the form of a log file containing only unique entries. This means that the rest of the source identification process is not influenced by frequency of communications between the two domains 120. This is important as it prevents results from being skewed by a single set of re-occurring communications 134 which could throw off the final results.

22. Voting Heuristics

A voting heuristic 164 is typically the most important sub-process within the source identification heuristic 158. The underlying premise of the voting heuristic 164 is that a communication 134 will be connected to by multiple different internet addresses on the same port from different source ports 142. This is a safe rule to use as a service port 142 must stay the same to allow users to connect to it, while client ports are always changing as any given computer connects to other systems.

Using this port rule of server side constant versus client change, the heuristic 164 creates a voting system to allow the system 100 to easily create and keep track of a score to determine which external address is a source 144 and which is a destination 146. Also, since an address can be both a source and a destination at the same time for different activities, the voting is done to application and port pairs.

The system 100 looks at one pair in the communication 134 to determine if it has occurred previously during the process. If it has occurred, that pair is increased in score, if it has not, it is set to 0. The heuristic 164 then looks to see if the opposite pairing (occurring alongside our pairing of focus) has occurred. If it has, then the heuristic 164 does the opposite of what it did for the first pairing. If the heuristic 164 added one to the opposite pair, then the heuristic 164 subtracts 1 from the current pair. If the heuristic 164 subtracted 1 (or set its value to 0) from the opposite pair, the heuristic 164 then adds one to the existing pair. This occurs twice over each communication 134 using the first pair as the starting point for the first one and the second pair for the starting point for the second one.

As this process goes on and on, the assigned and modified values of pairs can be constantly and iteratively modified. This constant addition and subtraction creates a situation where source pairs become negative numbers and destination pairs become high positive numbers. These numbers are the vote count for each one.

The heuristic 164 is not limited to looking at a single line of communications to determine indefinitely which is the source 144 and which is the destination 146. The system 100 can allow every line of communications 134 to contribute a vote into the final determination.

23. Domain Management Heuristics

A domain management heuristic 166 is a heuristic used by the system 100 to create, update, and delete domains 120 and the rules 126 associated with the domains 120. Many organizations have several types of rules 126 supporting their respective security programs. At the highest level of abstract these policies can be classified as either implicit or explicit. Explicit policies 126 can be easy to address as they are in some form of written document. To address the implicit policies a method for easily documenting these various policies was required and since organizations can have hundreds or thousands of policies, a method for automating the programming of these policies within the Threat Assessment Console (TAC) is typically desirable. The domain management heuristics 166 can document implicit domain information. This administrator interface 118 can create a domain matrix that will automatically walk the administrator 114 through the process of identifying and documenting allowed communications 134 between the various domain entries. Once the administrator interface 118 is populated with the required information the data it automatically sent as properly formatted input to the ICE policy editor.

III. Architecture Views

The system 100 can be implemented in a wide variety of different operating environments and architectures. Although the system 100 can be implemented using a wide variety of different architectures, such embodiments will typically include both an inter-domain communication engine (ICE) 174 and a threat intelligence engine (TIC) 172.

The Inter-domain Communication Engine (ICE) 174 normalizes data from numerous disparate network and security systems correlating it against the enterprises security policy domains 120 identifying inter-domain communication violations. ICE 174 remediates these unauthorized inter-domain communication violations to assure trusted communication within and outside of the enterprise.

The Threat Intelligence Engine (TIE) 172 correlates data from numerous disparate network and security systems into valuable actionable information enabling organizations to minimize threats 132 and their potential impact. TIE compares this threat data against global threat data 149 producing a personalized Threat Index or some other form of threat assessment 161. This allows the organization to be proactive verses reactive, thus identifying and mitigating threats 132 before they can have any adverse effect instead of waiting to first encounter a negative phenomenon so that a threat 132 can be identified.

A. Example #1

Figure 2:
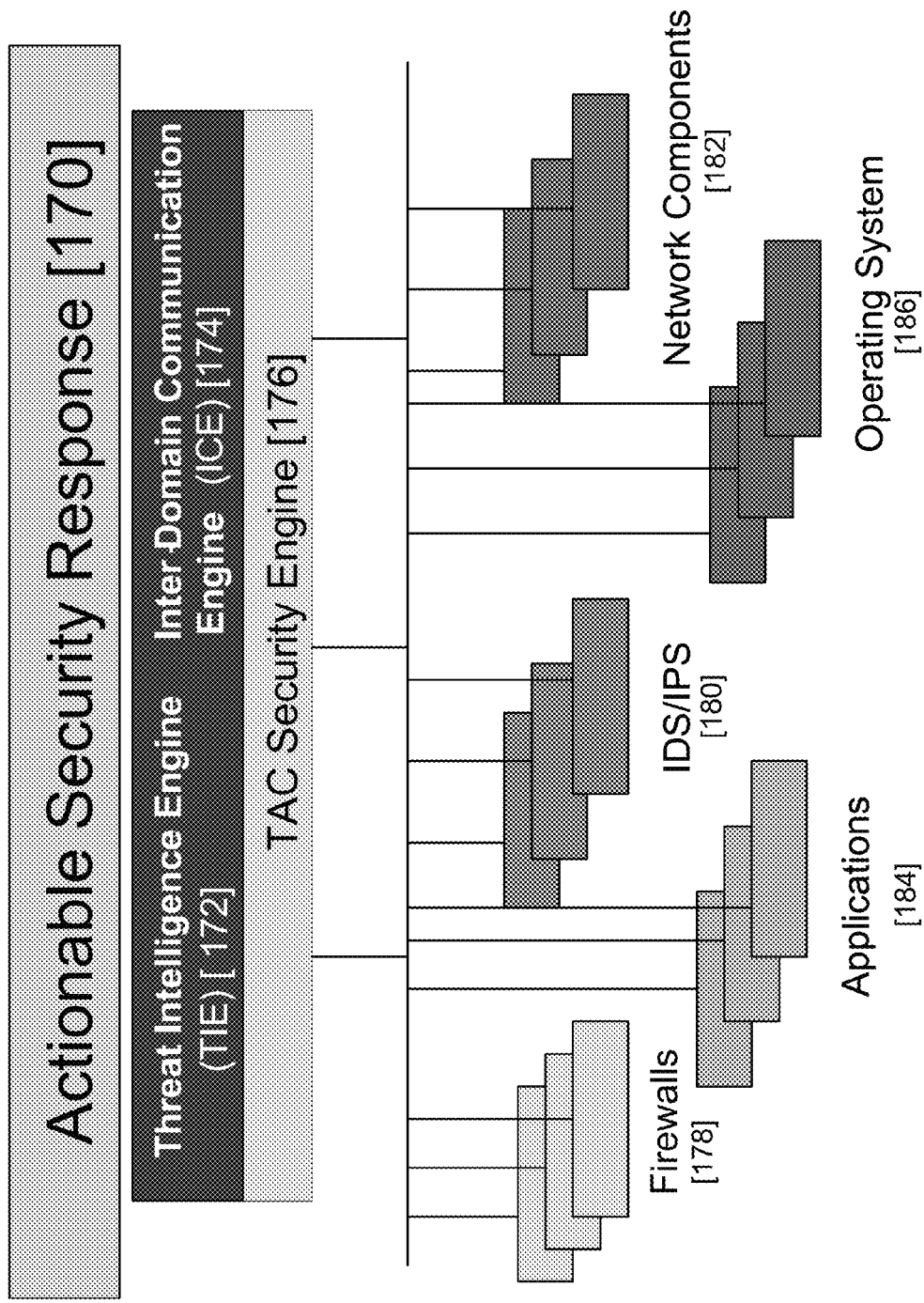
FIG. 2 is an architectural diagram illustrating an example of the system and some of the different processing layers that can be incorporated into the processing of the system in order to generate an actionable security response.

FIG. 2 is an architectural diagram illustrating an example of the system and some of the different processing layers that can be incorporated into the processing of the system 100 in order to generate an actionable security response 170.

As illustrated in the Figure, the system 100 can be configured to receive communications data 136 from a wide variety of different sources, including firewalls 178, applications 184, IDS/IPS 180, network components 182, operating systems 186, and other sources. These data sources provide information to a TAO (threat assessment console) security engine 176 which in turn uses an inter-domain communication engine (ICE) 174 to identify communications 134 that are in violation of applicable rules 126. A threat intelligence engine (TIE) 172 is then used to assess and prioritize threats 132 so that the system 100 can facilitate an actionable security response 170 in a fully automated, partially automated, or fully manual manner, consistent with the configuration of the system 100.

B. Example #2

Figure 3:
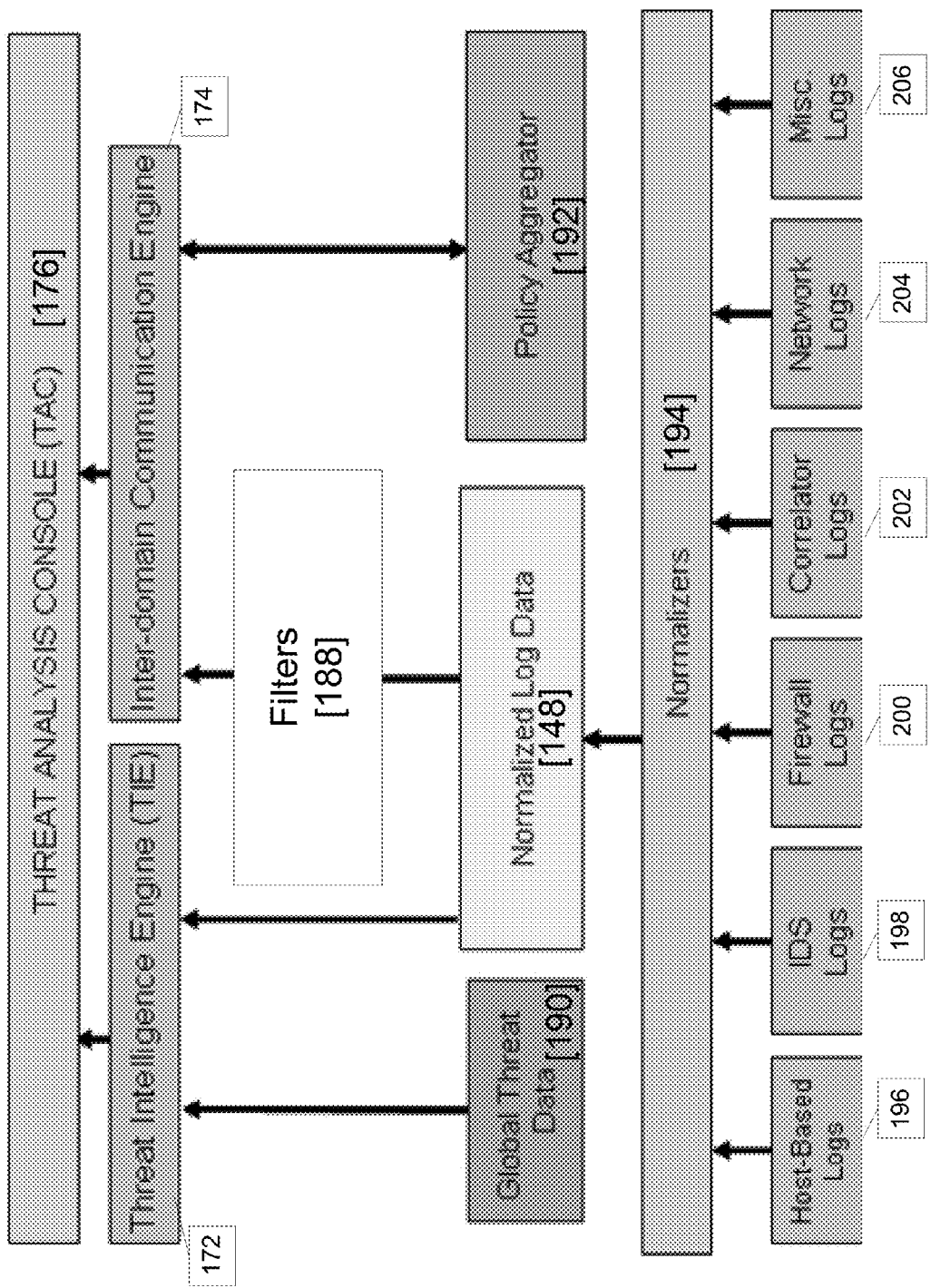
FIG. 3 is an architectural diagram illustrating an example of the system and a variety of different data sources and processing components that can be included in the system.

FIG. 3 is an architectural diagram illustrating an example of the system 100 and a variety of different data sources and processing components that can be included in the system 100. This diagram illustrates the bottom-up framework that the system 100 can embody.

Various logs 140, such as host-based logs 196, IDS logs 198, firewall logs 200, correlator logs 202, network logs 204, and miscellaneous logs 206 provide communications data 136 to one or more normalizers 194 which place such data into a uniform format for future processing and analysis.

The TIE 172 receives as inputs global threat data 190 and normalized log data 148 from the normalizers 194. The ICE 174 receives as inputs information from a policy aggregator 192 and data from the normalized log data 148 that is subject to one or more filters 188. The policy aggregator 192 is a means for managing rules 126, which in many embodiments can be set in accordance with a hierarchical tree of domains 120. A TAC 176 serves as an administrator interface 118 for processing by the TIE 172 and ICE 174.

IV. Subsystem Views

Figure 4:
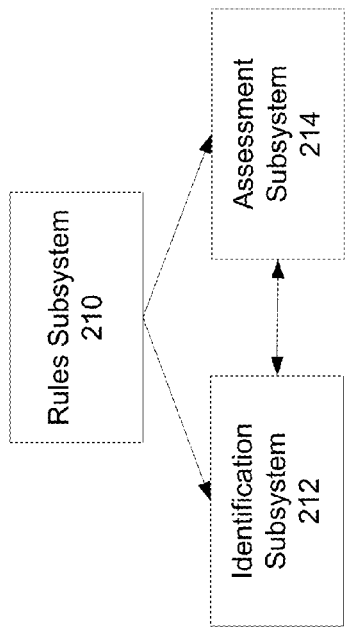
FIG. 4 is a block diagram illustrating an example of a subsystem-level view of the system.

FIG. 4 is a block diagram illustrating an example of a subsystem-level view of the system 100.

A. Rules Subsystem

A rules subsystem 210 can be used to define, update, and delete rules 126. In many embodiments of the rules subsystem 210, rules 126 and the domains 120 to which the rules 126 apply are organized into multi-level hierarchical relationships ranging from enterprise-wide rules 126 for a global organization to the rules 126 that apply to specific port 142 on a specific device 132. The rules subsystem 210 can be used to invoke domain management heuristics 166.

B. Identification Subsystem

An identification subsystem 212 can be used to identify potential threats 132 by identifying instances where one or more rules 126 for one or more domains 120 is violated by one or more interactions 136. The identification subsystem 212 can invoke a variety of heuristics, such as source identification heuristics 158, unique communication heuristics 162, and voting heuristics 164. The identification subsystem 212 can include controls 138 used to monitor domains 120 and a wide variety of different logs 140 that can be populated through controls 138 or through a variety of security applications 168.

C. Assessment Subsystem

An assessment subsystem 214 can be used to assess the importance of threats 132. In many embodiments, assessments 161 are numerical assessment metrics that can be compared to threshold values 159 and/or other numerical assessment metrics in order to prioritize the scrutiny given to various threats 132. The assessment subsystem 214 can be used to invoke a variety of different assessment heuristics 160. The processing of the assessment subsystem 214 can be influenced by a wide variety of different elements, including sources 144, destinations 146, address identifiers 150, unique addresses 151, statuses 163, threshold values 159, and vulnerability attributes 139.

Figure 5:
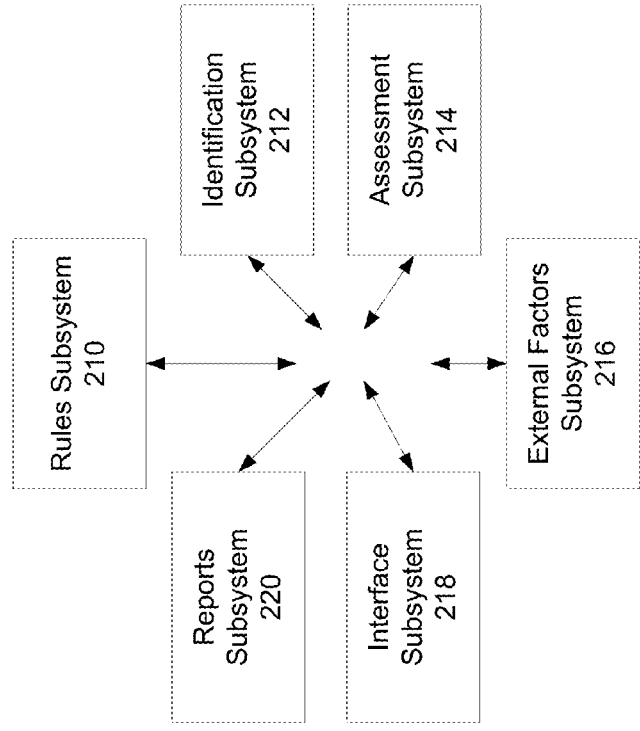
FIG. 5 is a block diagram illustrating an example of a subsystem-level view of the system.

FIG. 5 is a block diagram illustrating an example of a subsystem-level view of the system 100.

D. External Factors Subsystem

In some embodiments of the system 100, a separate and distinct subsystem, an external factors subsystem 216 is used to integrate global threat data 149 and other data sources extrinsic to a particular interaction 136 or communication 134 into the threat assessments 161 generated by the assessment subsystem 214.

E. Interface Subsystem

A wide variety of interfaces, including user interfaces 110 and administrator interfaces 118 can be collectively referred to as an interface subsystem 218. Different embodiments of the system 100 can include a wide variety of different interfaces and analytical tools 154 for the purpose of facilitating effective action on the part of an administrator 114. Different interfaces can be configured to transmit a variety of different reports 156. Advanced embodiments of the system 100 can include highly configurable administrator interfaces 118 that use color, sound, graphics, text, and other differentiators to highlight threats 132 based on the assessments 161 associated with those threats 132.

F. Reports Subsystem

Some embodiments of the system 100 can be configured to include a separate and distinct reports subsystem 220 that can be used to define, create, and update fully automated reports, reusable report templates, ad-hoc reports, and any other type of report 156 that can be generated by the system 100.

V. Process-Flow Views

The system 100 can be configured to perform a wide variety of different processes 128. Some processes are fully automated, while others may be partially automated or even fully manual. Processes 128 can be configured to be influenced by a wide variety of different factors, such as domains 120, rules 126, threats 132, communications 134, data transfers 133, communication data 136, sources 144, normalized log data 148, address identifiers 150, unique addresses 151, controls 138, destinations 146, global threat data 149, logs 140, ports 142, reports 156, analytical tools 154, hash tables 153, assessments 161, threshold values 159, statuses 163, security applications 168, vulnerability attributes 139, and various heuristics that can be implemented by the system 100.

A. Example #1

Figure 6:
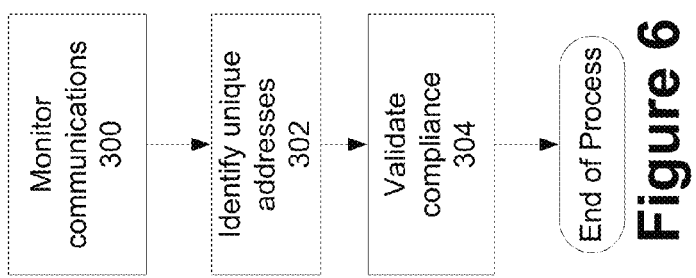
FIG. 6 is a flow chart diagram illustrating an example of how the system can identify non-compliant communication sources.

FIG. 6 is a flow chart diagram illustrating an example of how the system 100 can identify non-compliant communication sources 144 (e.g. sources 144 of communications 134 that are in violation of one or more rules 126).

At 300, communications 134 are monitored. The monitoring of communications 134 can be done using a wide variety of different logs 140 and controls 138. Communications 134 can be monitored in real time or in a periodic batch process. The system 100 can be configured to monitor all or substantially all communications data 136.

At 302, the system 100 identifies unique addresses 151. By grouping communications 134 by unique addresses 151, the ability of the system 100 to effectively process large quantities of communications data 136 is enhanced.

At 304, the system 100 can validate the compliance of communications 134 with respect to the rules 126 of the applicable domains 120 receiving the respective communications 134.

B. Example #2

Figure 7:
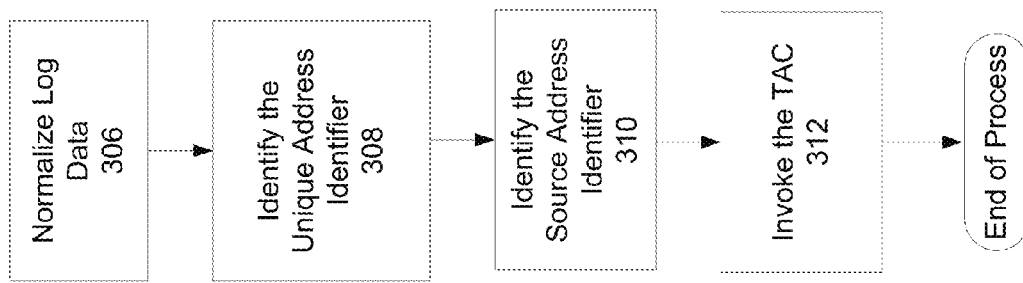
FIG. 7 is a flow chart diagram illustrating an example of the system providing actionable source and address information to a threat assessment console.

FIG. 7 is a flow chart diagram illustrating an example of the system 100 providing actionable source and address information to a threat assessment console.

At 306, communications data 136 is normalized. Such data can be gathered from a wide variety of different logs 140 and/or be captured from a wide variety of different controls 138.

At 308, unique address identifiers 151 are obtained.

At 310, source address identifiers 150 are obtained.

At 312, the system 100 can invoke a threat assessment console (a type of administrator interface 118) to display information relating to threats 132 in a manner conducive to the effective monitoring and remediation (if necessary) of such threats 132.

C. Example #3

Figure 8:
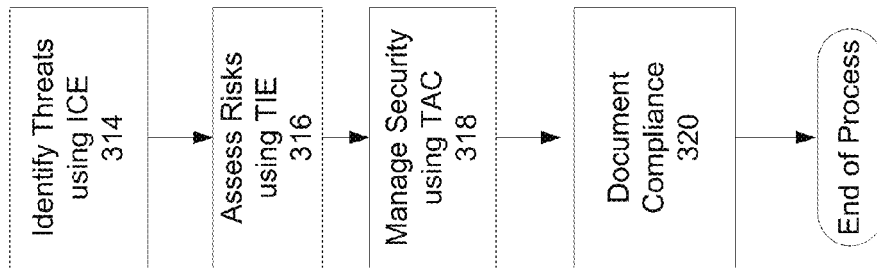
FIG. 8 is a flow chart diagram illustrating an example of the system using an inter-domain communication engine, a threat intelligence engine, and a threat assessment console to secure a network.

FIG. 8 is a flow chart diagram illustrating an example of the system using an inter-domain communication engine, a threat intelligence engine, and a threat assessment console to secure a network.

At 314, threats are identified using ICE 174.

At 316, risks are assessed using TIE 172.

At 318, TAC 176 is used to manage security, including potentially the invoking of an actionable security response 170.

At 320, compliance with rules 126 are documented.

D. Example #4

Figure 9:
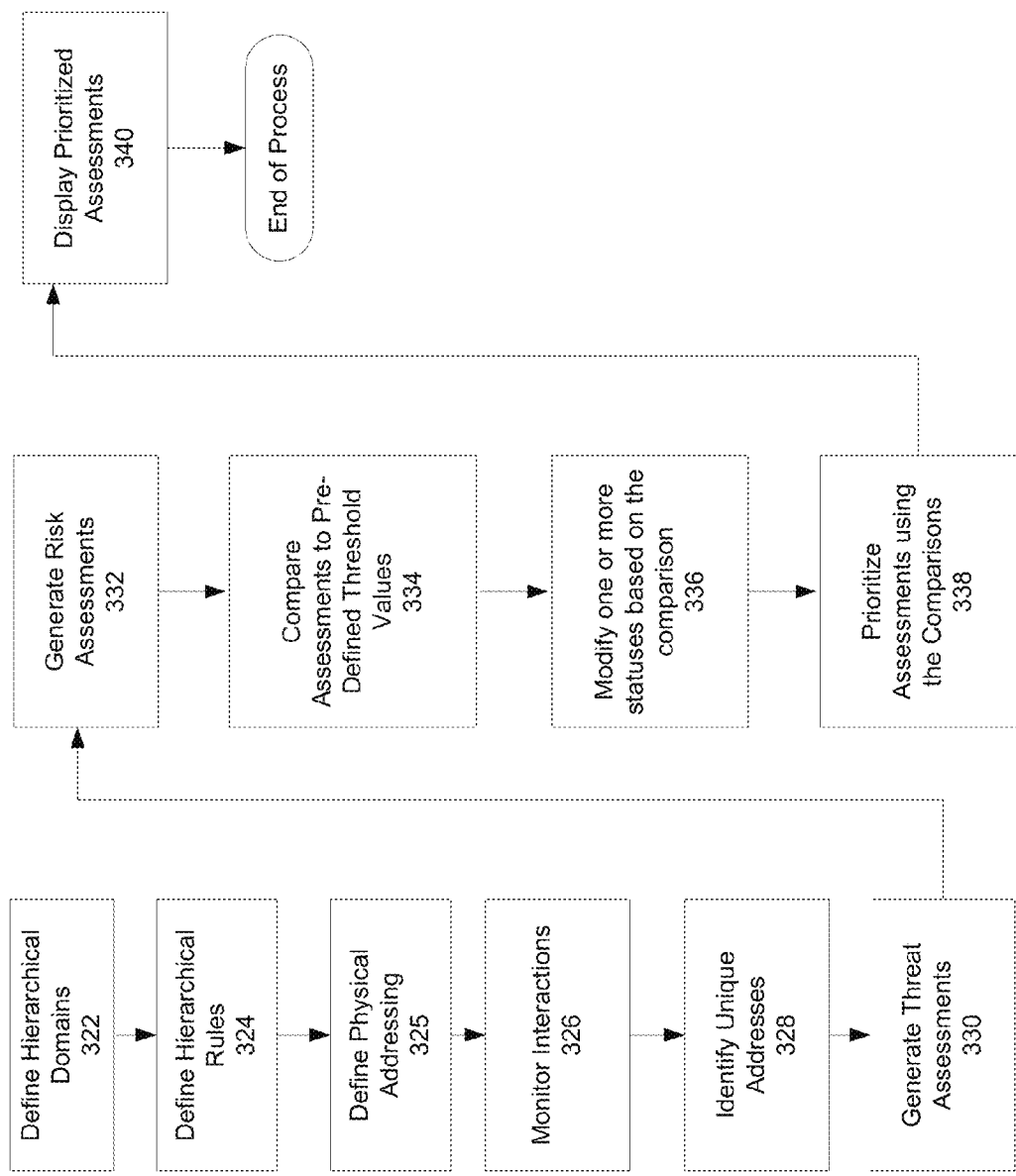
FIG. 9 is a flow chart diagram illustrating an example of the system prioritizing security threats.

FIG. 9 is a flow chart diagram illustrating an example of the system 100 prioritizing security threats.

At 322, hierarchical domains 120 can be defined. In some embodiments, the hierarchy can be three-levels deep, or even deeper.

At 324, hierarchical rules 126 can be defined. In some embodiments, the hierarchy can be three-levels deep, or even deeper.

At 326, interactions 136 such as communications 134 are monitored.

At 328, unique addresses 151 are identified.

At 330, threat assessments 161 are generated using all applicable input factors to influence (e.g. be factored into) the calculation of the assessments 161.

At 332, risk assessments that factor in vulnerability attributes 139 are generated.

At 334, threat assessments 161 can be compared to threshold values 159.

At 336, risk assessments 161 can be compared to threshold values 159.

At 338, assessments 161 are prioritized using the comparison analyses.

At 340, the prioritized assessments are displayed.

VI. Interface Views

There are several obstacles to effective security that are addressed by the system 100. One obstacle is the failure of prior art security approaches to monitor all or substantially communications data 136. Another obstacle is the ability to effectively communicate threat assessments 161 to administrators 114 in a way that allows administrators 114 to navigate substantial volumes of data in a manner that is comprehensive while still be prioritized to focus on the most important threats 132. Without effective administrative interfaces 118, administrators 114 can become overwhelmed by the sheer quantity of data. The interfaces of the system 100 can be configured to effectively manage the secured areas 102 of the system 100.

A. Communication Log

FIG. 10 is a screen print diagram illustrating an example of a communication log 140 for a particular communication source 144. The source 144 is a particular IP address 400.

B. Graphical Enterprise Security Policy Document

FIG. 11 is a screen print diagram illustrating an example a graphical enterprise security policy document.

Figure 12:
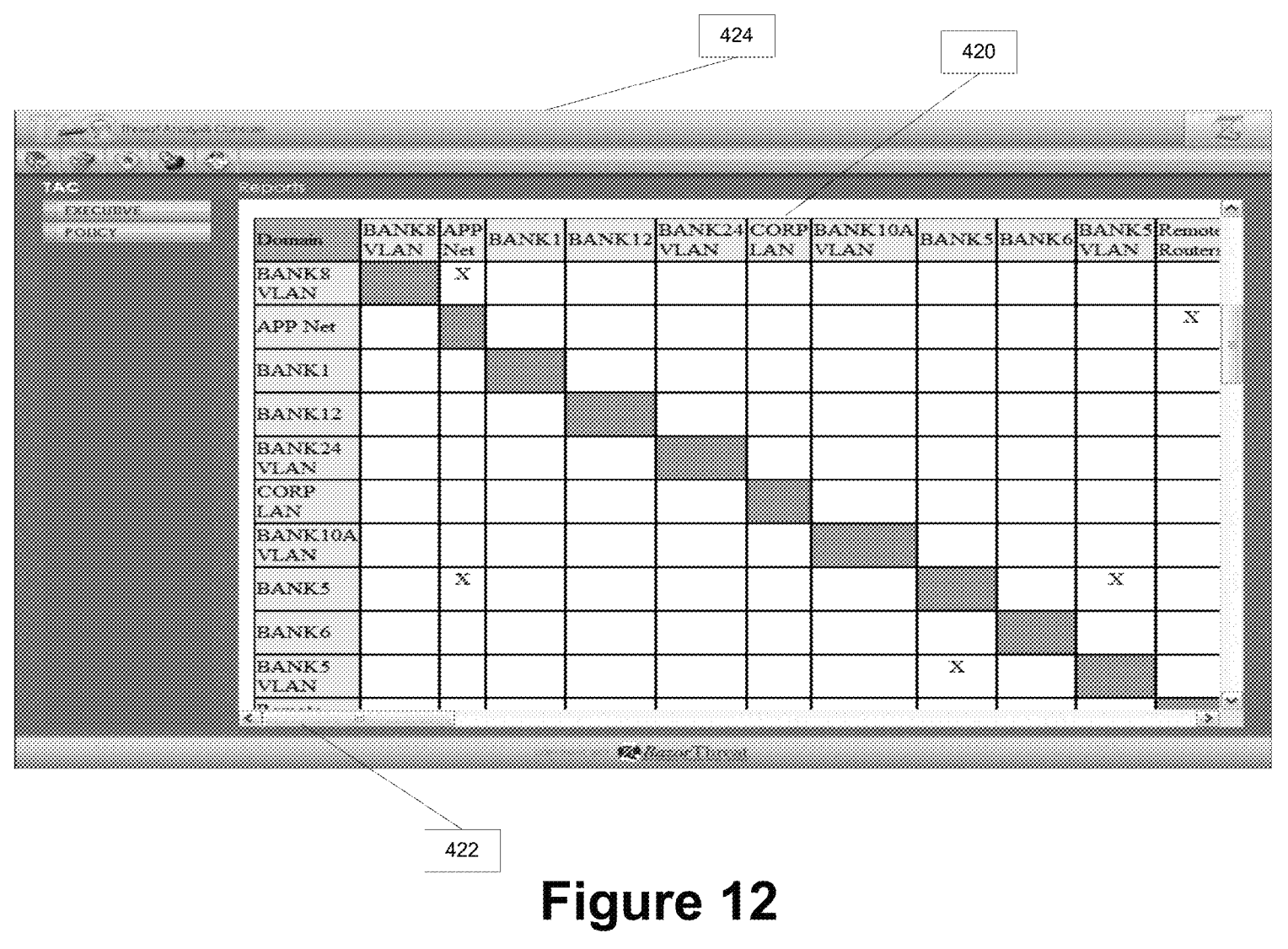

FIG. 12 is a screen print diagram illustrating an example a graphical enterprise security policy document 424.

The reporting capabilities in the enterprise security policy document 424 provide a way to streamline any compliance audit and to provide actual validation of effectiveness of every deployed control 138 in the secured area 102. It can be used to generate both graphical text-based reports 156. The document 424 has the ability to validate enterprise policy 126 in real time or a substantial real time manner to show compliance or non-compliance with stated policies 126.

C. Vulnerability Path

Figure 13:
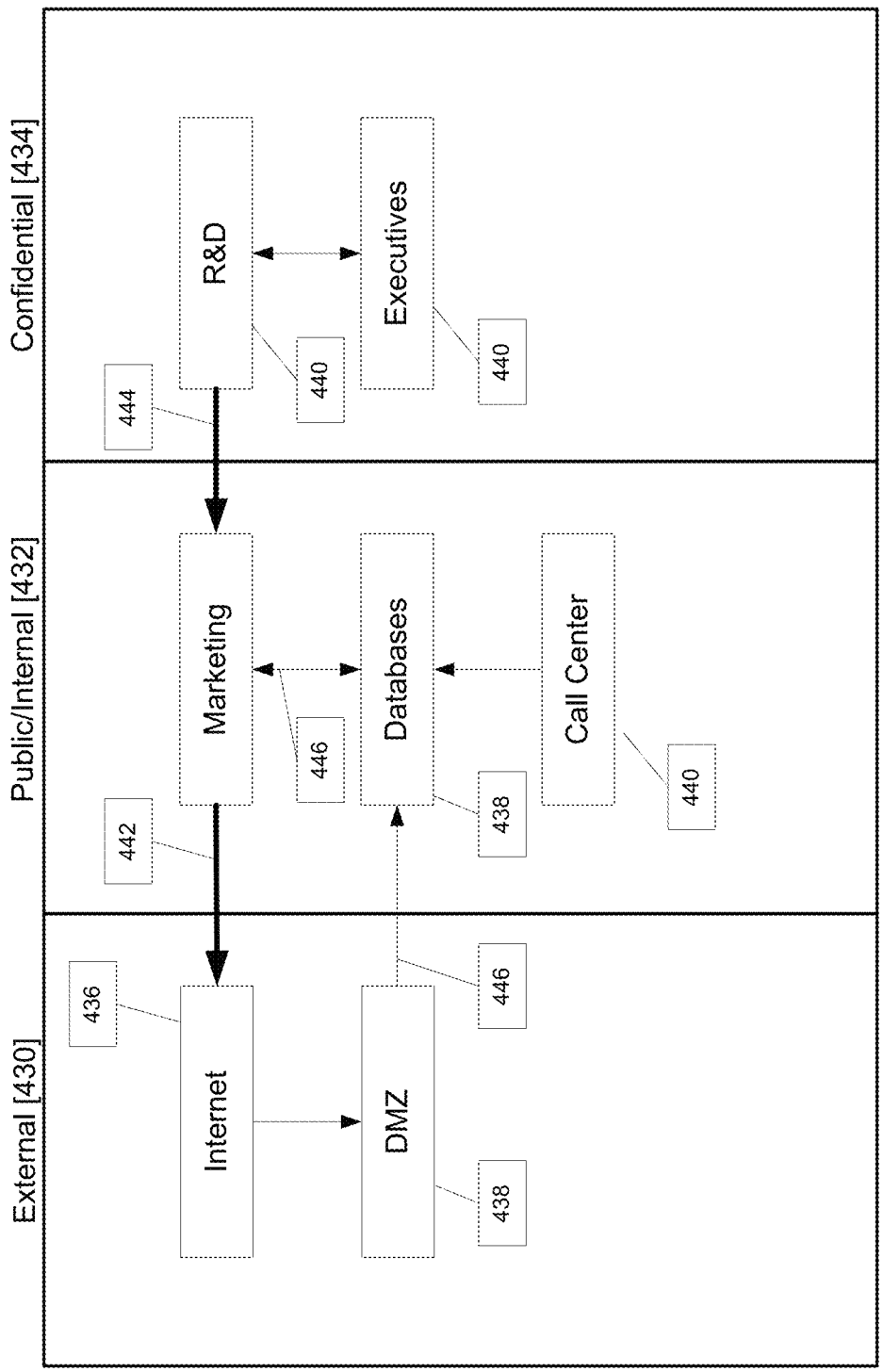
FIG. 13 is a block diagram illustrating an example of the system identifying communications in violation of a policy and the vulnerability path of such communications.

FIG. 13 is a block diagram illustrating an example of the system identifying communications in violation of a policy and the vulnerability path of such communications.

There are seven relatively high-level domains 120 illustrated in FIG. 13: the Internet, the DMZ (de-militarized zone), marketing, databases, call centers, R&D, and executive. Each domain 120 is associated with a high-level security category, such as eternal 430, public/internal 432, and confidential 434. Different embodiments of the system 100 can involve different numbers and different types of security categories.

The system 100 can be configured to illustrated vulnerability paths graphically, often times using color coding. For example, in FIG. 13, a detected policy violation 442 could be illustrated by one combination of color and text (such as a red arrow with the letters PV), a vulnerability path could be illustrated by a different combination of color and text (such as a red arrow with the character V), and a policy leak could be illustrated by yet a different combination of color and text (such as a yellow arrow with the letters PL).

In such an example, certain domains 440 such as R&D, Executives, and Call Center would be identified with one color to indicate the absence of vulnerability of leakage, other domains 438 such as databases and DMZ would be colored in a different color to indicate the presence of detected policy violations, and a third classification of domains 436 would be colored a third distinct way in order to identify the fact that confidential information could be leaked.

D. Enterprise-Wide Domain Visualization

Figure 14:
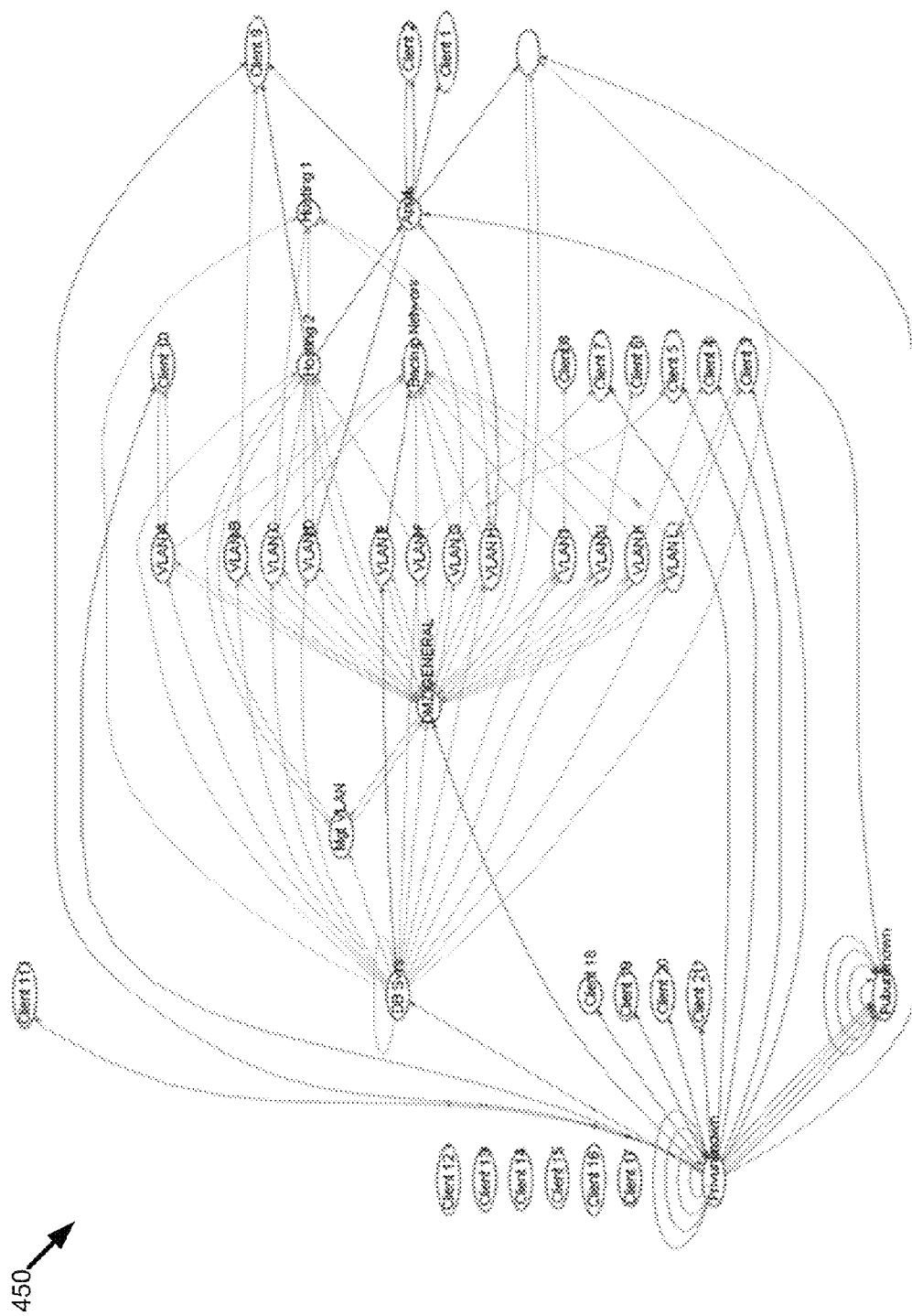
FIG. 14 is a screen print diagram illustrating an example of an enterprise-wide domain visualization.

FIG. 14 is a screen print diagram illustrating an example of an enterprise-wide domain visualization 450. The visualization 450 provides:

1. an enterprise risk picture via integration of vulnerability data with threat intelligence data.

2. a method for predicting where threats 132 will expose a vulnerability producing an impact to the system 100.

3. a graphical representation and picture of communications, threats and true risks within an enterprise communication system (e.g. the collective secured areas 102 of the enterprise).

4. the mapping of both vulnerabilities 139 and threats 132 are both mapped to the domains 120 where they exist. The existence of a vulnerability in a domain 120 that contains a threat will identify a real risk to the system and/or enterprise. The graphical representation of the enterprise domain structure will provide the ability to determine risk to other domains based upon allowed communications and current enterprise policy.

In some embodiments of the system 100, the existence of a threat or a vulnerability in a domain 120 will be represented as a yellow warning, a clean domain 120 will be represented as green and the existence of a threat and a vulnerability in a domain 120 will be represented as red signifying risk of impact.

E. Moving View of Enterprise-Wide Domain Visualization

Figure 15:
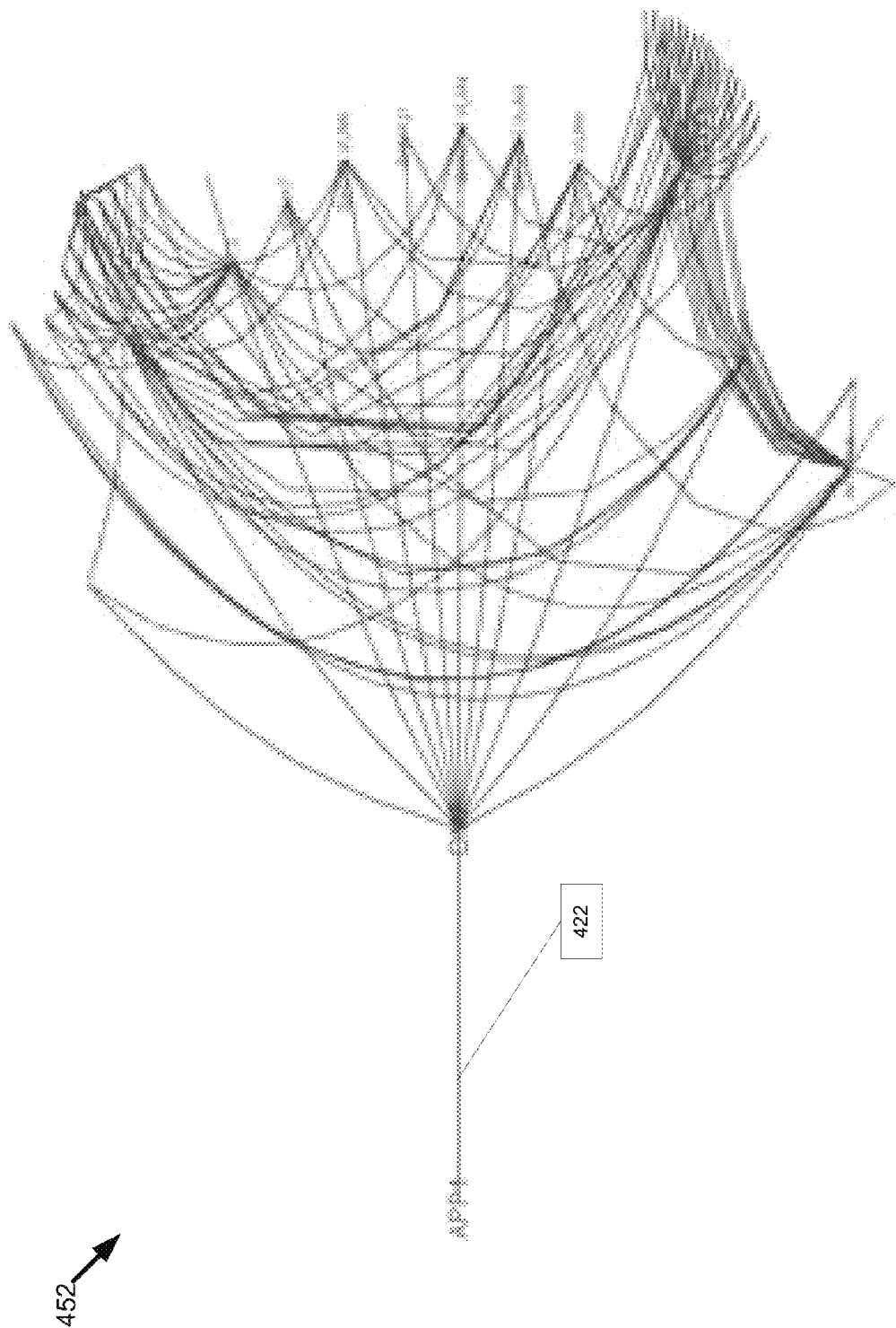
FIG. 15 is a screen print diagram illustrating an example of an enterprise-wide moving view of total domain visualization.

FIG. 15 is a screen print diagram illustrating an example of an enterprise-wide moving view of total domain visualization.

Total enterprise domain visualization provides for several functional advantages:

1. Graphical representation of communication domains to provide predictive analysis of threat propagation.

2. Representation of entire enterprise providing risk perspective and threat picture at an enterprise level. The TAO provides proactive means for determining and predicting threat propagation.

3. In the Figure, the line color indicates the status of communications between the various domains. The domains themselves are colored using the same scheme described above in the high level domain map. The hyper graph technology allows the user to move the perspective of view (i.e. zoom in/out, move up/down, move left/right, while preserving the overall reference perspective of the enterprise wide picture. This allows us to quickly identify and present the overall threat picture by showing the areas of risk relating to single existences of threats, vulnerabilities and allowed communication paths.

F. Rules Management Screens

Figure 16:
FIG. 16 is a screen print diagram illustrating an example of an administrator interface for defining domain rules.

FIG. 16 is a screen print diagram illustrating an example of an administrator interface for defining domain rules 126.

Figure 17:
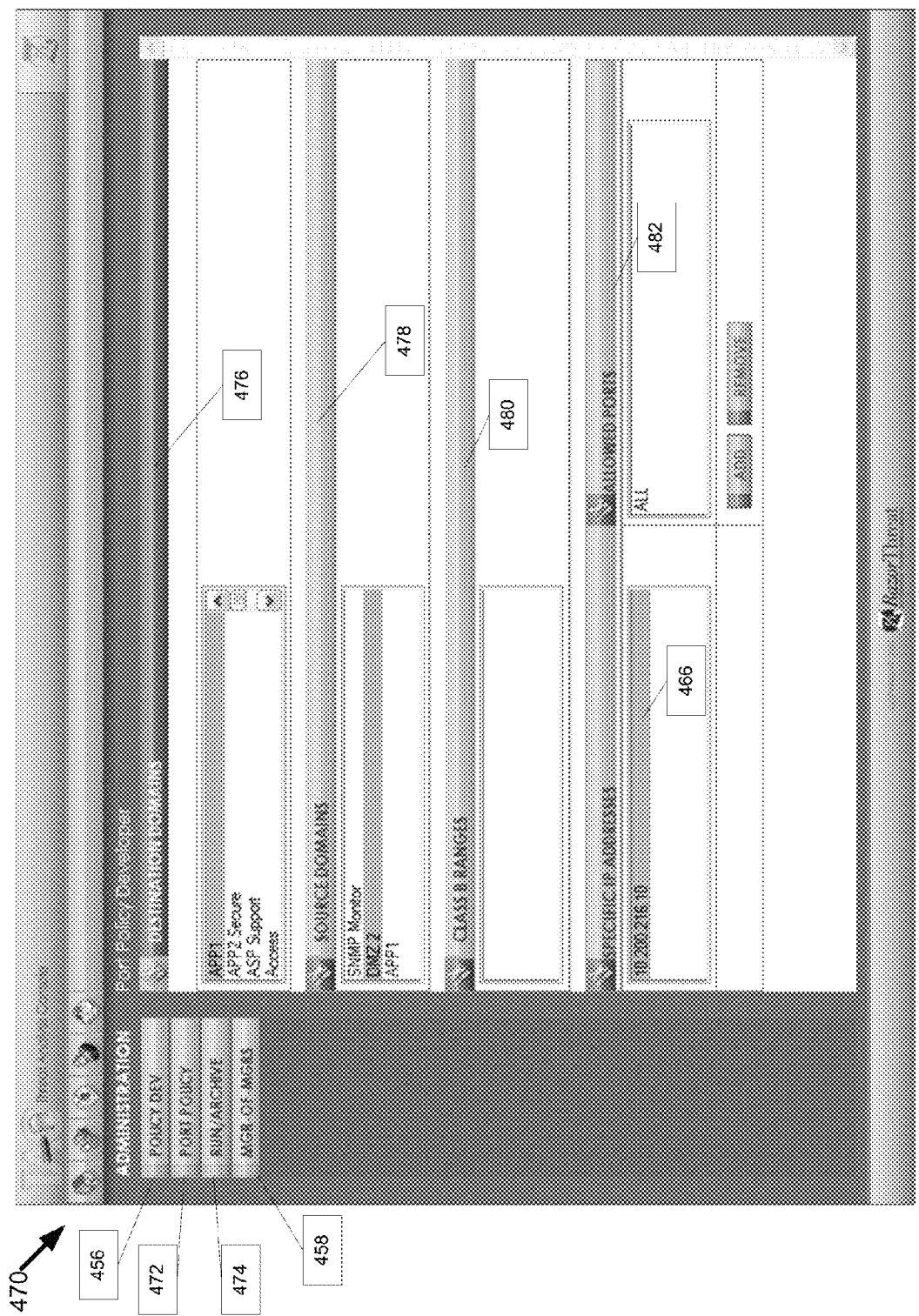
FIG. 17 is a screen print diagram illustrating an example of an administrator interface providing for linking certain rules to certain domains.

FIG. 17 is a screen print diagram of a port configuration screen 470 illustrating an example of an administrator interface 118 that can be used to link certain rules to certain domains and to then police the violation of rules 126 for domains 120 through the use of port or protocol IP addressing.

Specific protocol port information can be entered to provide additional granularity and further management of communications 134 between policy domains 120. Communications 134 can be authorized on a per port level between domains 120 or as granular as to a specific IP address. This improvement add to the capability to not only validate communications 134 between domains 120 but to validate the type of communication 134 as either authorized or unauthorized allowing for very granular policing of the communications 134 within an enterprise communication systems.

Figure 22:
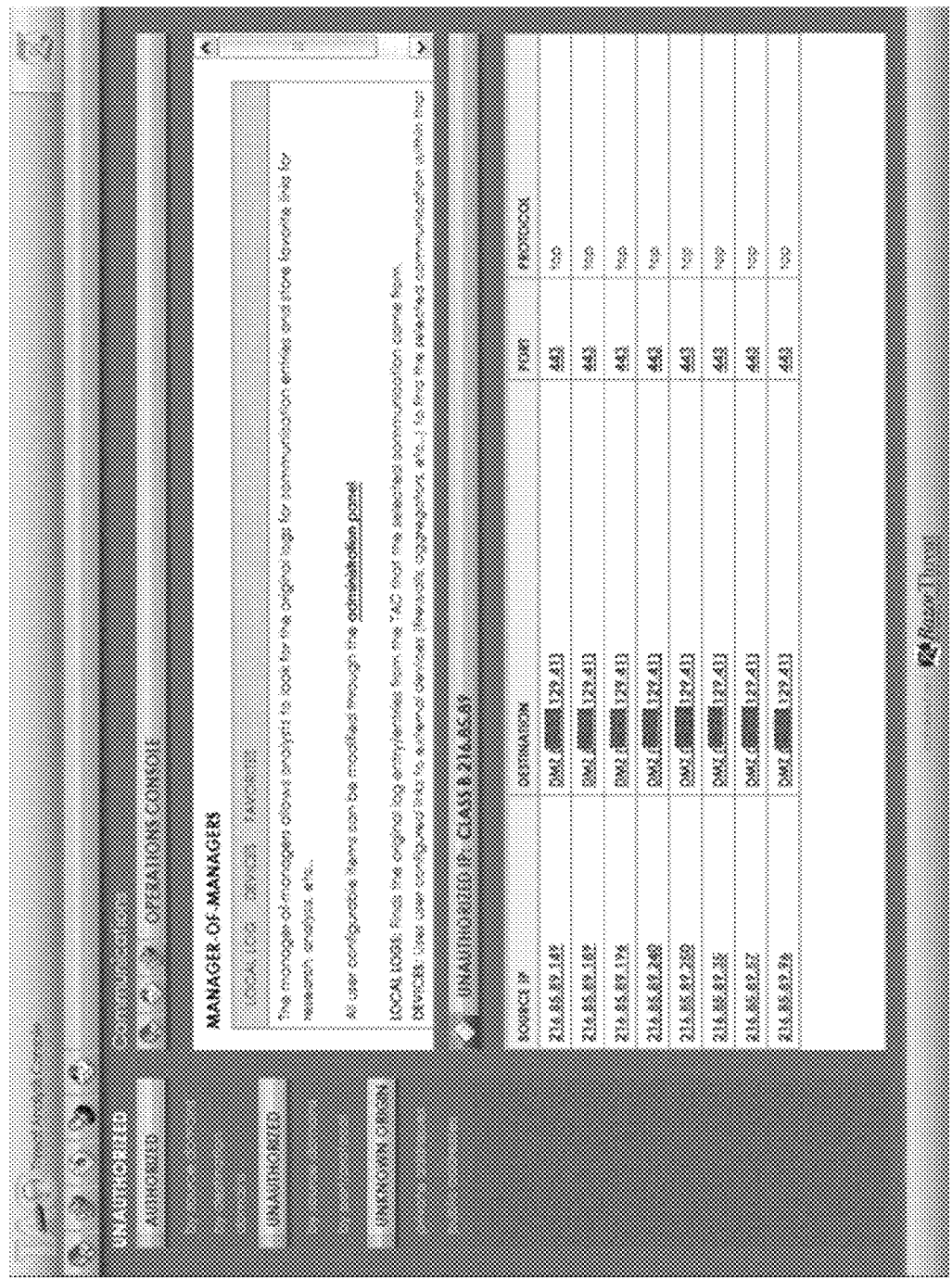
FIG. 22 is a screen print diagram illustrating an example of a manager-of-managers screen that can be incorporated into the system.

The buttons on the left side of the screen 470 include a policy development button that moves the user to the screen for creating rules 126, a port policy button 472 for navigating to a port policy screen that can be used to define ports 142, a run/archive button 474 that can be used to navigate to an archive screen (see FIG. 18) for archiving communications data 136, and a manager-of-managers button 458 that can be invoked by a user to navigate to the manager-of-manager screen (see FIG. 22).

G. Operations Consoles

Figure 18:
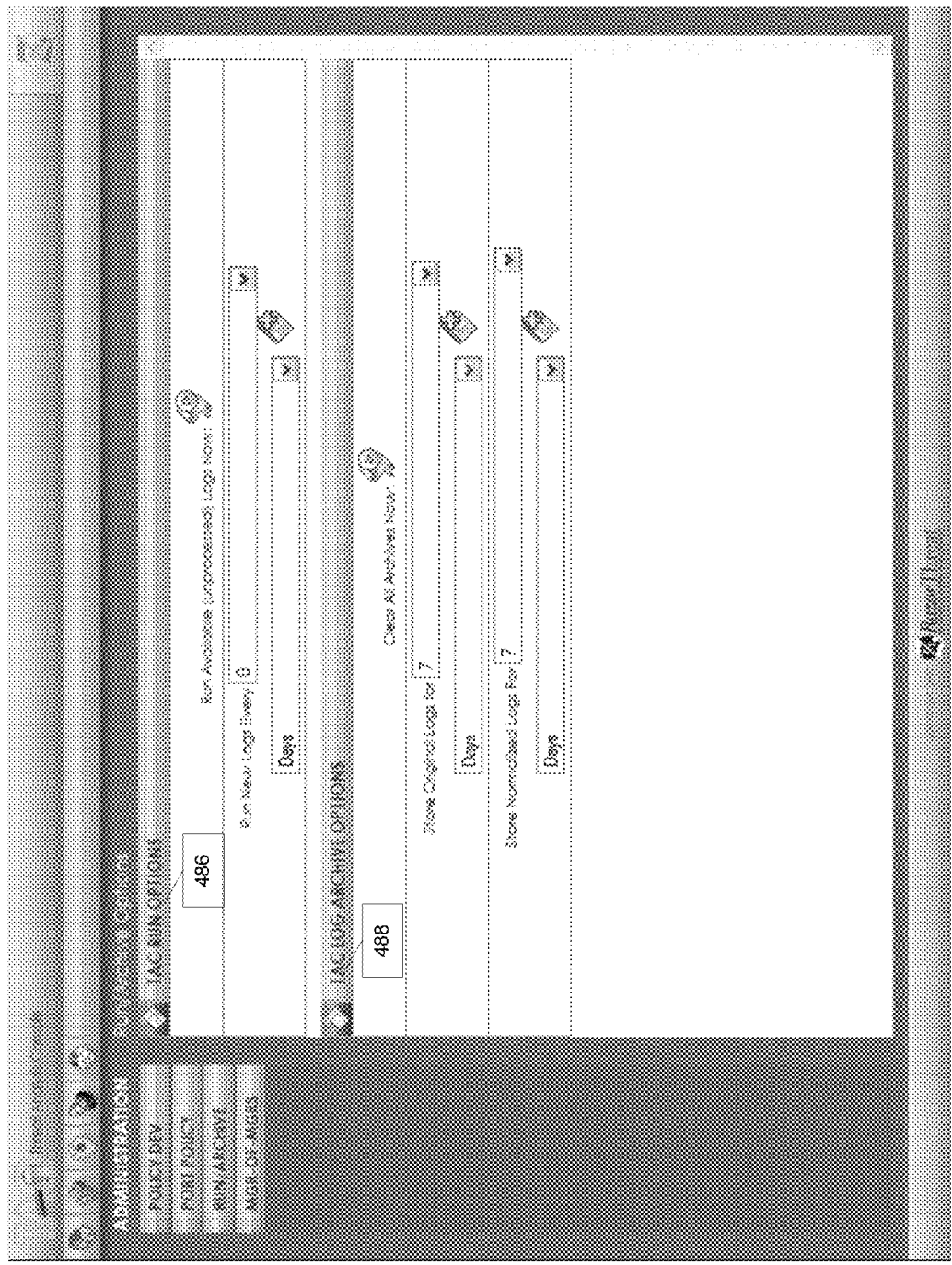
FIG. 18 is a screen print diagram illustrating an example of an operations console which can be used to monitor communications.

FIG. 18 is a screen print diagram illustrating an example of an operations console which can be used to monitor communications.

Figure 19:
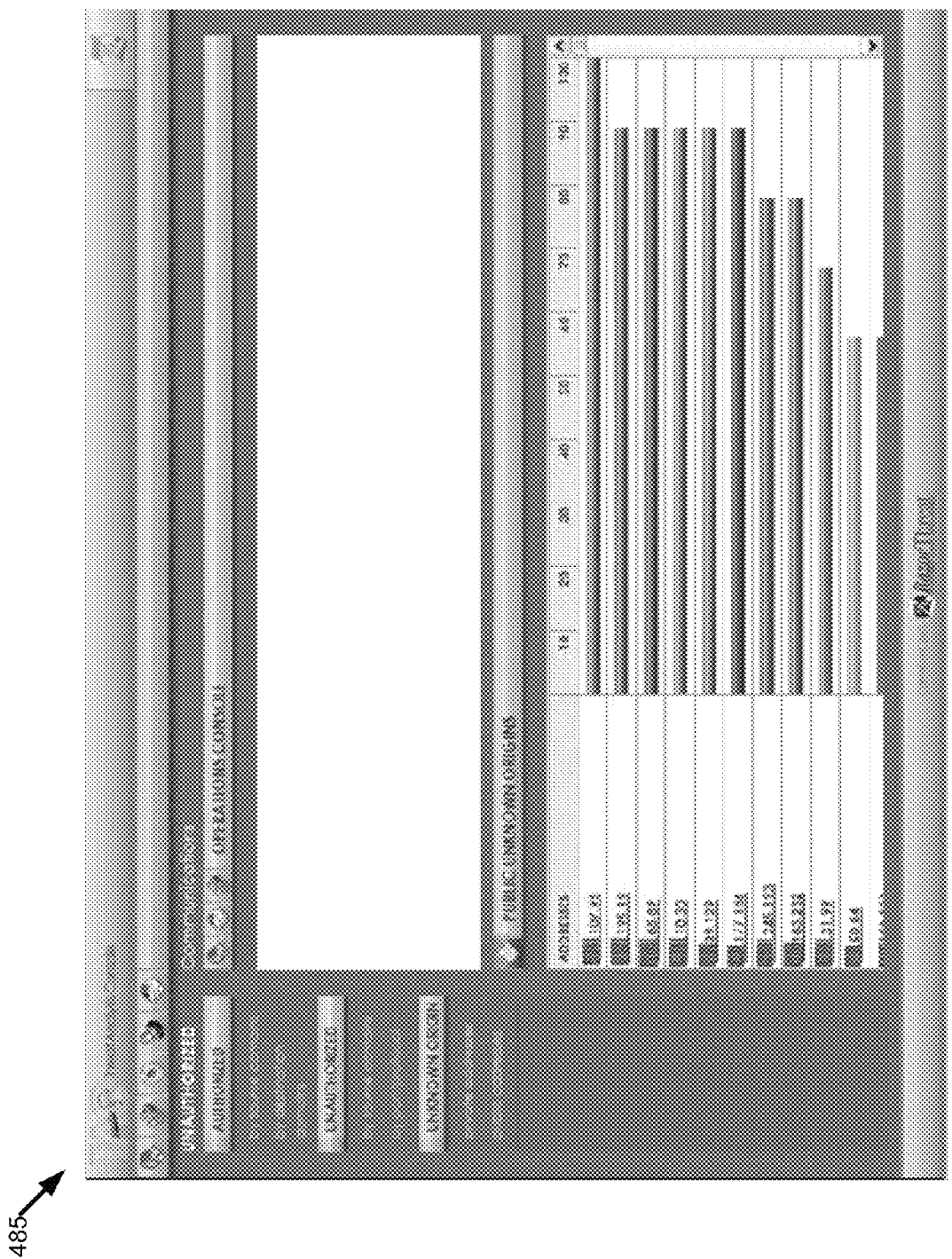
FIG. 19 is a screen print diagram illustrating an example of an administrative archive screen that can be used to manage large volumes of communication data.

FIG. 19 is a screen print diagram illustrating an example of an administrative archive screen that can be used to manage large volumes of communication data.

Figure 20:
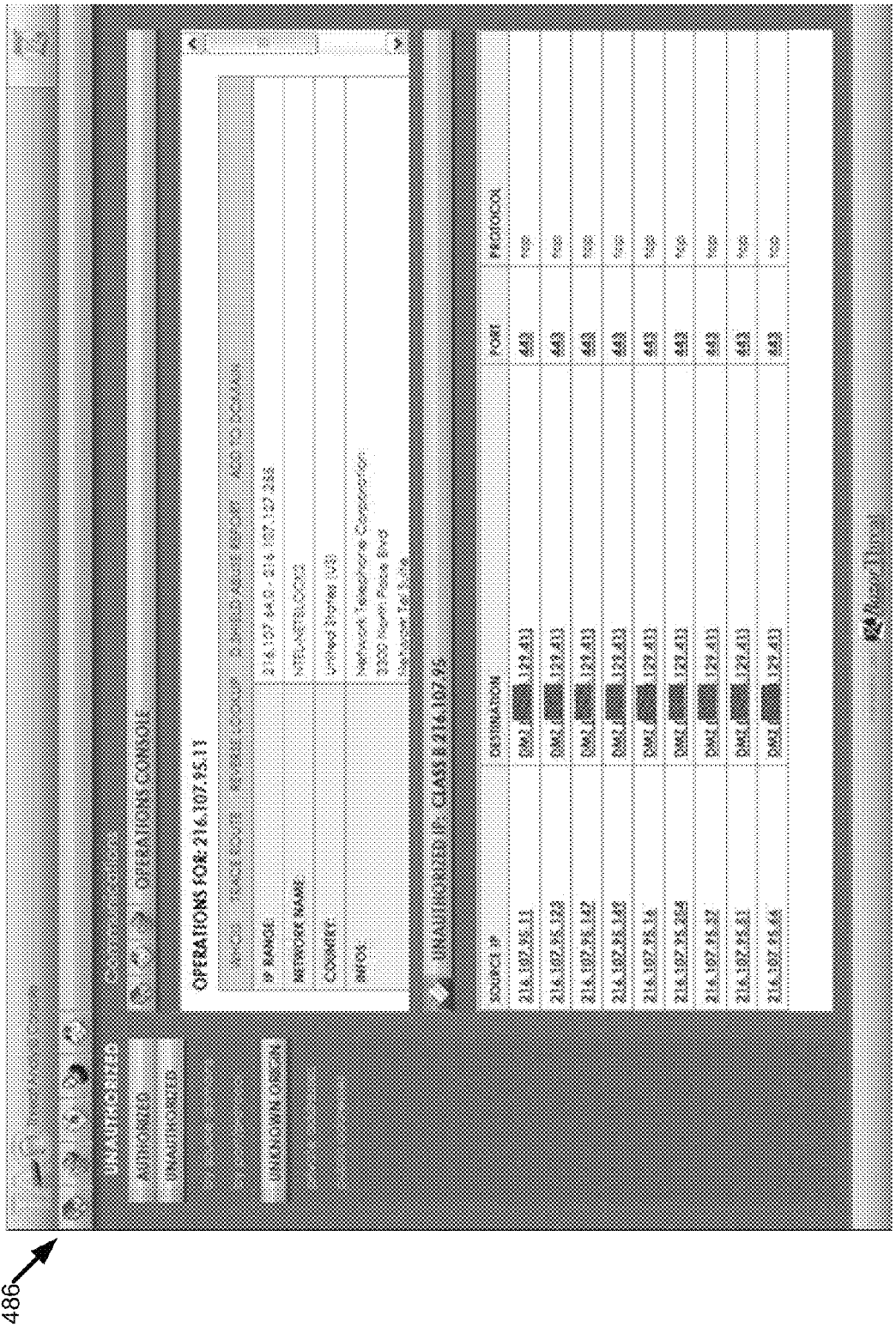
FIG. 20 is a screen print diagram illustrating an example of an operations console which can be used to monitor communications.

FIG. 20 is a screen print diagram illustrating an example of an operations console which can be used to monitor communications.

Figure 21:
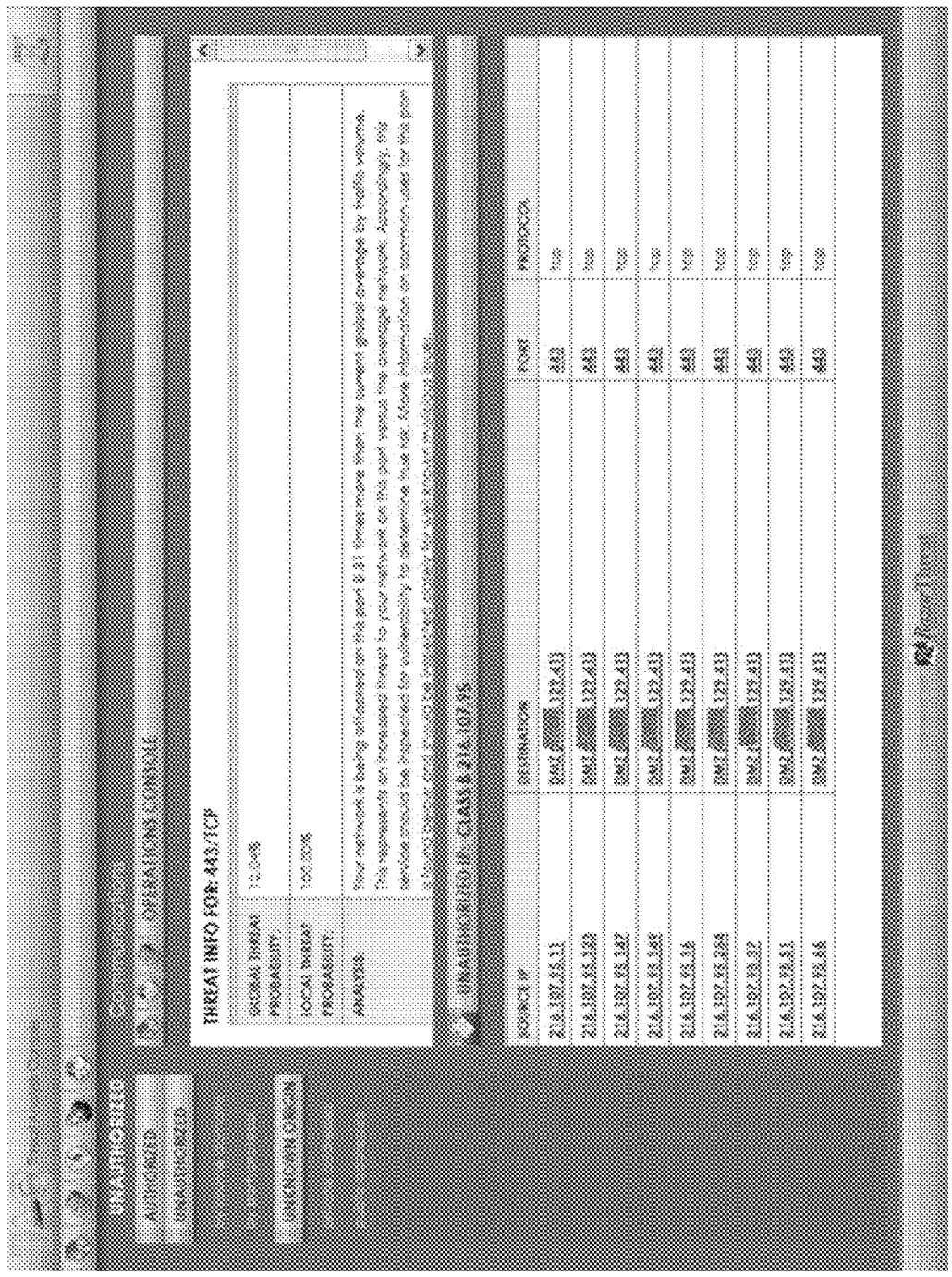
FIG. 21 is a screen print diagram illustrating an example of an operations console displaying a threat analysis and threat assessment metric.

FIG. 21 is a screen print diagram illustrating an example of an operations console displaying a threat analysis and threat assessment metric.

FIG. 22 is a screen print diagram illustrating an example of a manager-of-managers screen 492. The manager-of-managers screen 492 can be configured to display unauthorized communications 134 and unauthorized communication sources in a prioritized manner that is highly customizable and configurable.

The invention claimed is:

1. A method for securing a secured area that includes a network connecting a plurality of computers that comprise a plurality of processors, said method comprising:
    defining a plurality of rules pertaining to said secured area, wherein the plurality of rules are stored on one of said computers;
    validating one or more source and destination IP address pairs listed in a communications log from internal packet flow data on the network from one or more communication sources inside of the secured area of the network for compliance with said plurality of rules, wherein said plurality of rules includes consideration of the source IP address and defines permissibility of communication from the source IP address to the destination IP address;
    generating a threat assessment metric based on the permissibility of communication from the source IP address to the destination IP address;
    comparing the threat assessment metric with a predetermined threshold value to determine whether said given communications source is in compliance with said plurality of rules; and
    wherein said secured area comprises a plurality of domains and a plurality of networks, said method further comprising defining hierarchical domains on the networks, wherein the network said security rules are hierarchical network security rules, and wherein hierarchical network security rules are associated with hierarchical domains on the networks, and wherein a first domain is defined as a subset of a second domain and wherein associating one or more rules with said second domain automatically associates the one or more rules with said first domain.

2. The method of claim 1, wherein the threat assessments is associated with a unique addresses, and, wherein a hash table is used to identify unique addresses from the communication data, wherein at least one threat assessment is numerical, wherein no unique address is associated.

3. The method of claim 1, further comprising: displaying a safe domain in a first color, displaying a domain associated with a threat or a vulnerability as a second color, displaying a domain associated with a threat and a vulnerability as a third color, and providing a graphical representation of at least a subset of the threats and risks within an enterprise.

4. The method of claim 1, further comprising authorizing a communication on a per port level, and validating the type of communication as being either authorized or unauthorized.

5. The method of claim 1, wherein the threat assessments is associated with a unique addresses, further comprising receiving at least a subset of the communications data from a plurality of communication logs, normalizing the communication data before identifying the unique addresses, and receiving global threat information, wherein at least one numerical threat assessment is influenced by the global threat information.

6. The method of claim 1, further comprising automatically creating numerical threat assessments and automatically prioritizing potential threats in substantial accordance with the numerical threat assessments, wherein numerical threat assessments are created for an authorized communication and an unauthorized communications.

7. The method of claim 1, further comprising associating the threat assessment with a unique destination IP address, wherein the identification of a particular unique destination IP addresses is not influenced by the frequency of communications originating from that unique address and wherein a voting heuristic is used to influence the identification of the unique addresses.

8. The method of claim 1, further comprising associating the threat assessment with a unique destination IP address and distinguishing between unique destination IP addresses that are sources and unique destination IP addresses that are not sources by invoking a source destination identification heuristic.

9. The method of claim 1, further comprising interrogating an unauthorized communication to set a malicious intent assessment, creating a plurality of threat assessments, identifying an enterprise risk, and displaying at least a subset of said treat assessments and said enterprise risk in a graphical format on a security dashboard interface.

10. The method of claim 1, wherein a said security dashboard interface can provides for presenting a plurality of identified threats and a plurality of identified risks in order of importance, and wherein said security dashboard interface can further provides for generating a enterprise risk propagation prediction and identify one or more preventative measures on a domain by domain basis.

11. The method of claim 1, further comprising:
    creating threat assessments that are associated with all or substantially of the monitored communications;
    assessing vulnerability attributes and using the vulnerability attributes in conjunction with the threat assessments to create risk assessments that are associated with the threats that are associated with threat assessments;
    automatically prioritizing risk assessments; and
    displaying the threats in accordance with the magnitude of the corresponding risk assessment.

12. The method of claim 1, further comprising creating a graphical policy compliance report automatically without human intervention, wherein said graphical policy compliance report is a two dimensional matrix.

* * * * *